US011886238B2

(12) United States Patent
Shin et al.

(10) Patent No.: US 11,886,238 B2
(45) Date of Patent: Jan. 30, 2024

(54) FOLDABLE ELECTRONIC DEVICE

(71) Applicant: Samsung Electronics Co., Ltd., Suwon-si (KR)

(72) Inventors: Kwangho Shin, Suwon-si (KR); Hyosung Kang, Suwon-si (KR); Minsoo Kim, Suwon-si (KR); Yongwoon Kim, Suwon-si (KR); Myeongsil Park, Suwon-si (KR); Sangyup Lee, Suwon-si (KR); Jinwan An, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 272 days.

(21) Appl. No.: 17/452,036

(22) Filed: Oct. 22, 2021

(65) Prior Publication Data

US 2022/0043481 A1 Feb. 10, 2022

Related U.S. Application Data

(63) Continuation of application No. PCT/KR2020/005222, filed on Apr. 20, 2020.

(30) Foreign Application Priority Data

Apr. 23, 2019 (KR) .......................... 10-2019-0047546

(51) Int. Cl.
*G06F 1/16* (2006.01)
*G06F 3/041* (2006.01)

(52) U.S. Cl.
CPC .......... *G06F 1/1616* (2013.01); *G06F 1/1652* (2013.01); *G06F 1/1656* (2013.01);
(Continued)

(58) Field of Classification Search
CPC combination set(s) only.
See application file for complete search history.

(56) References Cited

U.S. PATENT DOCUMENTS 9,733,751 B2 * 8/2017 Lo .......................... G06F 1/1652
10,347,700 B2 * 7/2019 Yang ....................... H10K 71/00
(Continued)

FOREIGN PATENT DOCUMENTS

KR 20130090385 A 8/2013
KR 20170081512 A 7/2017
(Continued)

OTHER PUBLICATIONS

International Search Report and Written Opinion of the International Searching Authority in connection with International Application No. PCT/KR2020/005222 dated Jul. 17, 2020, 10 pages.

*Primary Examiner* — Lisa Lea-Edmonds

(57) ABSTRACT

According to various embodiments, an electronic device includes: a hinge; a foldable housing including a first housing connected to the hinge and has a first surface facing a first direction and a second surface facing a second direction that is opposite to the first direction, and a second housing connected to the hinge has a third surface facing a third direction and a fourth surface facing a fourth direction that is opposite to the third direction, and is folded about the hinge to overlap the first housing; a flexible display disposed inside the foldable housing and extending from above the first surface of the first housing onto the third surface of the second housing; and a touch panel disposed adjacent to the flexible display, wherein the touch panel includes a first touch panel disposed on the first surface and a second touch panel disposed on the third surface.

20 Claims, 16 Drawing Sheets

(52) U.S. Cl.
CPC .......... *G06F 1/1681* (2013.01); *G06F 3/0412* (2013.01); *G06F 3/04164* (2019.05); *G06F 2203/04111* (2013.01)

(56) References Cited

U.S. PATENT DOCUMENTS

| | | | | |
|---|---|---|---|---|
| 10,945,343 | B2* | 3/2021 | Yoon | G06F 1/1652 |
| 11,075,251 | B2* | 7/2021 | Yang | H10K 71/00 |
| 11,357,109 | B2* | 6/2022 | An | H04M 1/0216 |
| 11,647,595 | B2* | 5/2023 | Yoon | H10K 77/111 |
| | | | | 361/807 |
| 2011/0234485 | A1 | 9/2011 | Kitahara et al. | |
| 2014/0362505 | A1* | 12/2014 | Jang | H05K 9/0075 |
| | | | | 361/679.4 |
| 2015/0255518 | A1* | 9/2015 | Watanabe | H01L 27/1225 |
| | | | | 257/43 |
| 2015/0324046 | A1* | 11/2015 | Lo | G06F 3/0412 |
| | | | | 345/173 |
| 2017/0192597 | A1* | 7/2017 | Kang | G06F 1/3262 |
| 2018/0246608 | A1* | 8/2018 | Huh | G06F 3/046 |
| 2019/0214435 | A1* | 7/2019 | Yang | G06F 3/0412 |
| 2019/0235681 | A1* | 8/2019 | Li | G06F 3/0445 |
| 2020/0081562 | A1* | 3/2020 | Shi | G06F 3/0446 |
| 2020/0260597 | A1* | 8/2020 | Yoon | G06F 1/1637 |
| 2021/0105894 | A1* | 4/2021 | Oh | H05K 1/0281 |
| 2021/0161022 | A1* | 5/2021 | Yoon | H05K 5/0017 |
| 2022/0020825 | A1* | 1/2022 | Yang | H10K 71/00 |
| 2022/0043481 | A1* | 2/2022 | Shin | G06F 3/0412 |
| 2022/0046796 | A1* | 2/2022 | An | H05K 5/0004 |
| 2022/0075413 | A1* | 3/2022 | Park | H05K 5/0226 |
| 2022/0129094 | A1* | 4/2022 | Tatsuno | G06F 1/1616 |
| 2022/0368786 | A1* | 11/2022 | Kim | G06F 1/1686 |
| 2023/0276581 | A1* | 8/2023 | Yoon | H05K 5/0226 |
| | | | | 361/807 |

FOREIGN PATENT DOCUMENTS

| | | |
|---|---|---|
| KR | 20180090243 A | 8/2018 |
| KR | 20180099230 A | 9/2018 |
| WO | 2018121441 A1 | 7/2018 |

\* cited by examiner

FOLDABLE ELECTRONIC DEVICE

CROSS-REFERENCE TO RELATED APPLICATIONS

This application is a continuation of International Application No. PCT/KR2020/005222 filed on Apr. 20, 2020, which claims priority to Korean Patent Application No. 10-2019-0047546 filed on Apr. 23, 2019, in the Korean Intellectual Property Office, the disclosures of which are herein incorporated by reference in their entirety.

BACKGROUND

1. Field

Various embodiments of the present disclosure relate to a foldable electronic device.

2. Description of Related Art

Electronic devices refer to devices that perform particular functions according to installed programs, such as home appliances, electronic notes, portable multimedia players (PMPs), mobile communication terminals, tablet personal computers (PCs), video/audio devices, desktop/laptop computers, vehicle navigation systems, and so forth. For example, these electronic devices may output stored information in an audio or video format. With the increasing integration of electronic devices and the common use of ultra-high-speed and large-volume wireless communication, various functions have been recently installed in a single electronic device such as a mobile communication terminal. For example, an entertainment function such as games, a multimedia function such as music/video playback, a communication and security function for mobile banking, and a function such as schedule management or electronic wallets as well as a communication function have been integrated into a single electronic device. Such electronic devices have been miniaturized to allow users to carry them conveniently.

As mobile communication services are expanded to the multimedia service area, users may use multimedia services as well as voice calls or short messages through electronic devices. To avoid inconvenience caused to users in using multimedia services, electronic devices are increasingly equipped with large displays. Moreover, in recent years, a foldable electronic device having a flexible display disposed therein has been disclosed.

According to an embodiment, a foldable electronic device may include a flexible display that is be typically designed to be folded in a central portion thereof. A conventionally disclosed touch panel (e.g., a digitizer panel) is designed without considering that it is disposed adjacent to a flexible display panel. For example, a rigid-type touch panel integrally extending from a rear surface of the display panel may be disposed to continuously recognize an input of an input device in the entire region of a display panel regardless of whether the electronic device is folded.

The touch panel may generally include a plurality of conductive patterns forming a conductive loop for forming a magnetic field, and the touch panel may have a structure vulnerable to a physical shock or force applied thereto. In the electronic device including the touch panel, when a folding operation is repeatedly performed, various types of damages (e.g., cracks, ruptures) of the touch panel may occur in a portion corresponding to a folding region of the flexible display panel.

According to various embodiments of the present disclosure, there is provided a foldable electronic device. An electronic device according to the present disclosure may provide a display including a display panel and a touch panel disposed adjacent to a flexible display panel. According to various embodiments of the present disclosure, there is provided a touch-panel mounting structure preventing a damage of a touch panel in a portion corresponding to a folding region of the flexible display panel.

According to various embodiments of the present disclosure, there is provided a foldable electronic device including a touch panel formed to continuously recognize an input made by an input device in a folding region of a display.

SUMMARY

According to various embodiments of the present disclosure, an electronic device includes a hinge; a foldable housing including a first housing connected to the hinge and including a first surface facing a first direction and a second surface facing a second direction opposite to the first direction; and a second housing connected to the hinge, including a third surface facing a third direction and a fourth surface facing a fourth direction opposite to the third direction, and being folded with the first housing around the hinge; a flexible display viewed from an outside of at least one surface of the foldable housing and extending from the first surface of the first housing to the third surface of the second housing; and a touch panel disposed adjacent to the flexible display, in which the touch panel includes a first touch panel disposed on the first surface of the first housing and a second touch panel disposed on the third surface of the second housing, and each of the first touch panel and the second touch panel includes a first layer on which a pattern is formed, a second layer on which a pattern different from the pattern formed on the first layer is formed, and a third layer electrically connected to the pattern of the second layer.

According to various embodiments of the present disclosure, an electronic device includes a hinge; a foldable housing including a first housing connected to the hinge and including a first surface facing a first direction and a second surface facing a second direction opposite to the first direction; and a second housing connected to the hinge, including a third surface facing a third direction and a fourth surface facing a fourth direction opposite to the third direction, and being folded with the first housing around the hinge; a display panel viewed from an outside of at least one surface of the foldable housing and extending from the first surface of the first housing to the third surface of the second housing; a touch panel disposed adjacent to the display panel; and a processor disposed in the first housing or the second housing and electrically connected to the display panel and the touch panel, in which the touch panel includes a first touch panel disposed on the first surface of the first housing and a second touch panel disposed on the third surface of the second housing, in which the first touch panel includes a first-first layer on which a pattern is formed, a first-second layer on which a pattern different from the pattern formed on the first-first layer is formed, and a first-third layer electrically connected to the pattern of the first-second layer by using at least two conductive vias, and the second touch panel includes a second-first layer on which a pattern is formed, a second-second layer on which a pattern different from the pattern formed on the second-first layer is formed, and a second-third layer electrically connected to the pattern of the second-second layer by using at least two conductive vias.

An electronic device according to various embodiments of the present disclosure may include touch panels respectively in a first housing and a second housing forming a foldable housing, thereby preventing a damage of the touch panels in a folding region.

The electronic device according to various embodiments of the present disclosure may include a separate layer (e.g., a third layer) to form a conductive loop pattern in adjacent to facing portions of different touch panels, thus securing recognition performance of a dual-type touch panel for an input device.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
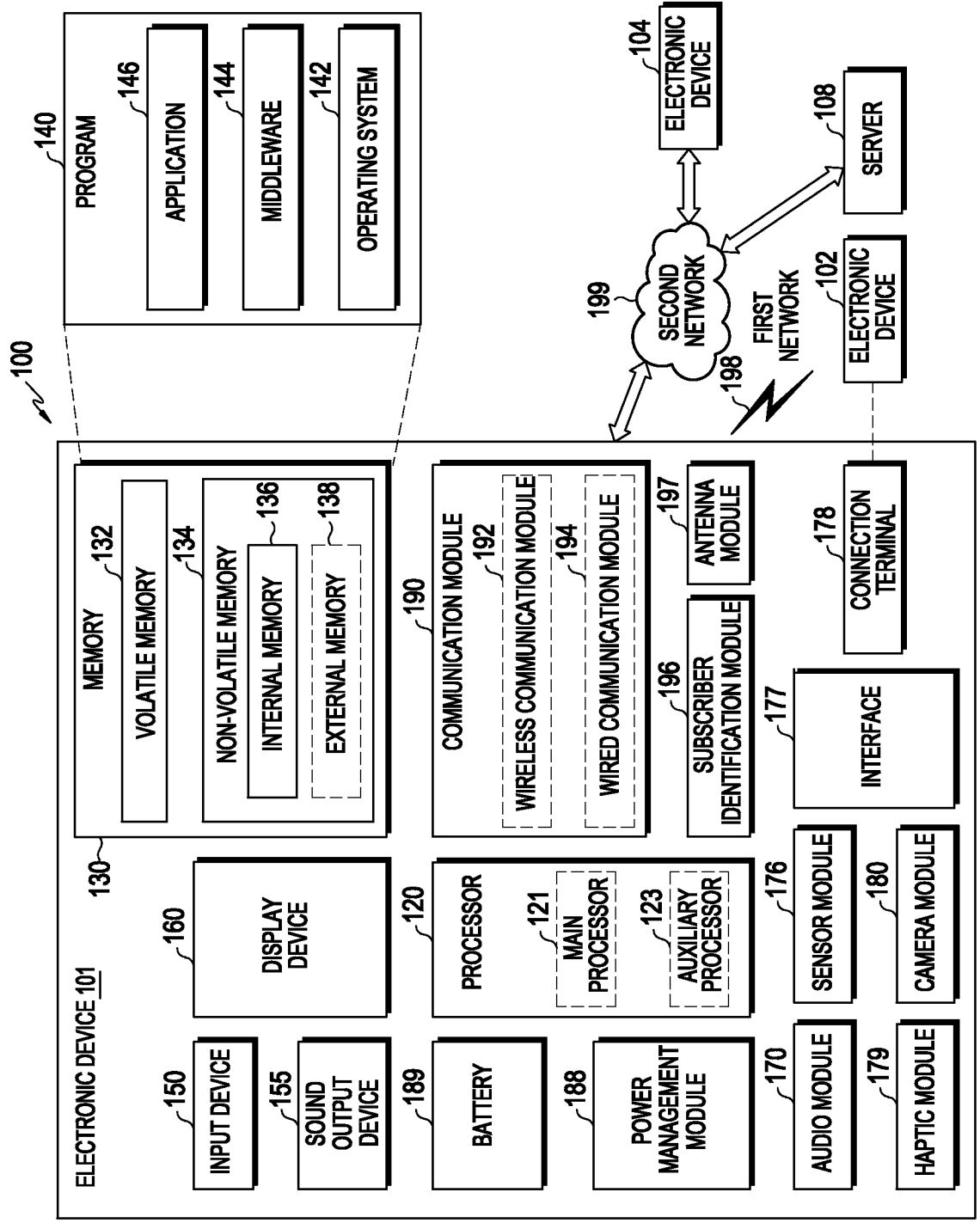
FIG. 1 is a block diagram of an electronic device in a network environment, according to various embodiments of the present disclosure.

FIG. 1 is a block diagram showing an electronic device 101 in a network environment 100, according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as a single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 connected to the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from an outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment of the present disclosure, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, the hologram device, and the projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal or vice versa. According to an embodiment of the present disclosure, the audio module 170 may obtain the sound via the input device 150, or output the sound via the sound output device 155 or a headphone of an external electronic device (e.g., an electronic device 102) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the present disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment of the present disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment of the present disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment of the present disclosure, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wireless-Fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment of the present disclosure, all or some of operations to be executed at the electronic device 101 may be executed at one or more of the external electronic devices 102, 104, or 108. For example, when the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments disclosed herein may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the present disclosure, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. When distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, the integrated component may perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
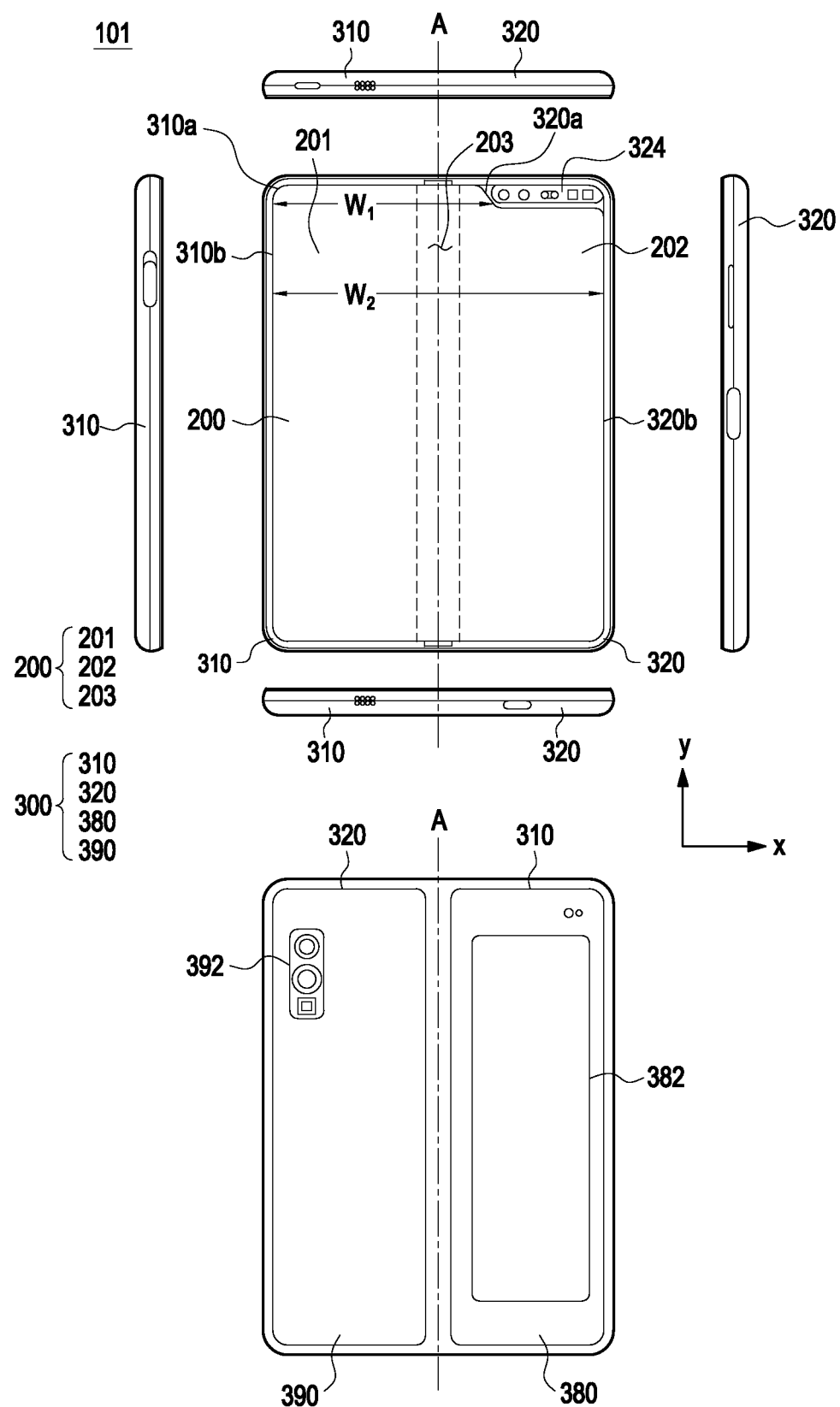
FIG. 2 is a diagram showing an unfolded status of an electronic device, according to various embodiment of the present disclosure.
Figure 3:
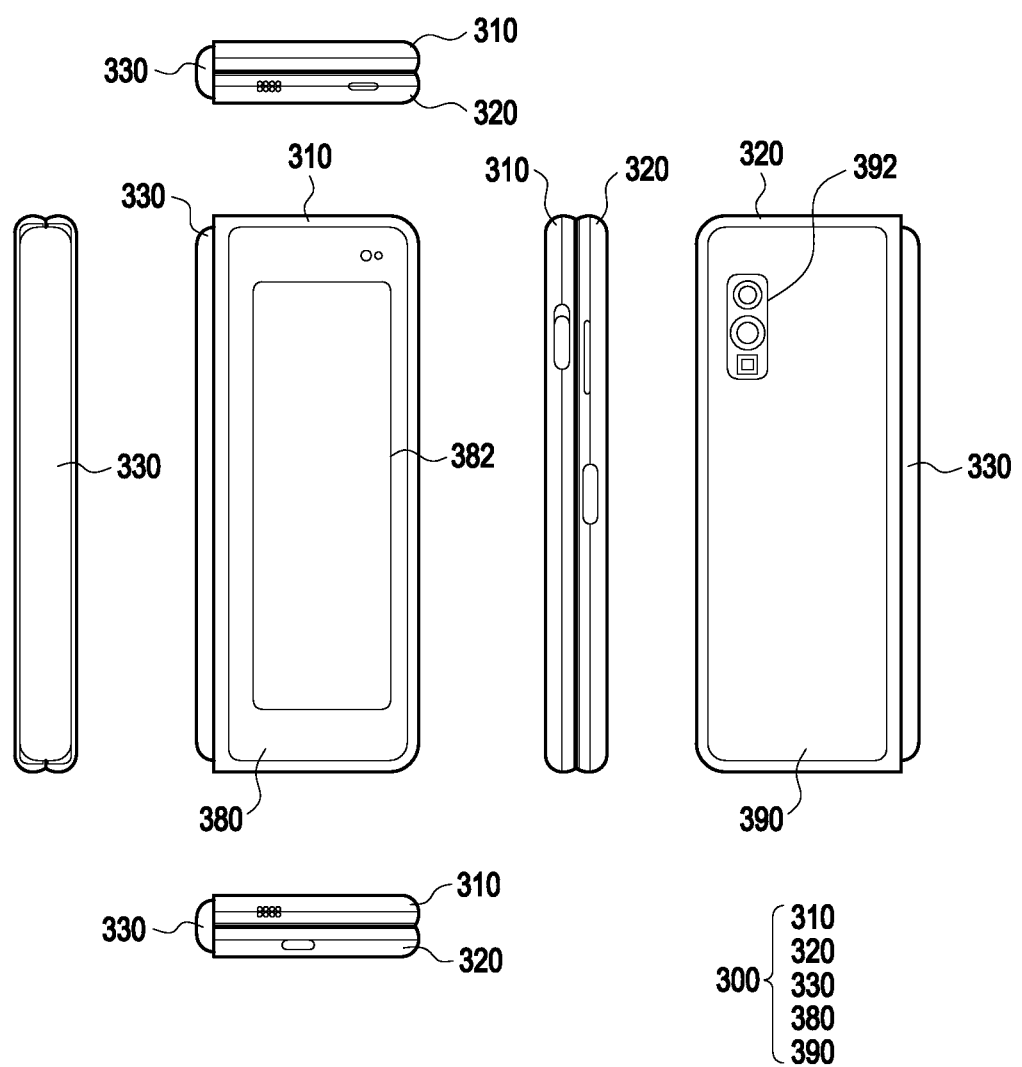
FIG. 3 is a diagram showing a folded status of an electronic device, according to various embodiment of the present disclosure.

FIG. 2 is a diagram showing an unfolded status of the electronic device 101, according to various embodiment of the present disclosure. FIG. 3 is a diagram showing a folded status of the electronic device 101, according to various embodiment of the present disclosure.

Referring to FIGS. 2 and 3, in an embodiment, the electronic device 101 may include a foldable housing 300, a hinge cover 330 covering a foldable portion of the foldable housing 300, and a flexible or foldable display 200 (hereinafter, a "display" 200 for short) (e.g., the display device 160 of FIG. 1) disposed in a space formed by the foldable housing 300. According to an embodiment, a surface on which the display 200 is disposed (or a surface where the display 200 is seen from an outside of the electronic device 101) may be defined as a front surface of the electronic device 101. A surface opposite to the front surface may be defined as a rear surface of the electronic device 101. A surface surrounding a space between the front surface and the rear surface may be defined as a side surface of the electronic device 101.

According to various embodiments, the foldable housing 300 may include a first housing 310, a second housing 320 including a sensor region 324, a first rear cover 380, and a second rear cover 390, and a hinge (e.g., a hinge 510 of FIG. 4 to be described later). The foldable housing 300 of the electronic device 101 may not be limited to the shape and coupling shown in FIGS. 2 and 3, and may be implemented by a combination and/or coupling of other shapes or parts. For example, in another embodiment, the first housing 310 and the first rear cover 380 may be integrally formed, and the second housing 320 and the second rear cover 390 may be integrally formed.

According to various embodiments, the first housing 310 may be connected to a hinge (e.g., the hinge 510 of FIG. 4 to be described later), and may include a first surface facing a first direction (e.g., a first surface 311 of FIG. 4 to be described later) and a second surface (e.g., a second surface 312 of FIG. 4 to be described later) facing a second direction opposite to the first direction. The second housing 320 may be connected to the hinge 510, may include a third surface facing a third direction (e.g., a third surface 321 of FIG. 4 to be described later) and a fourth surface (e.g., a fourth surface 322 of FIG. 4 to be described later) facing a fourth direction opposite to the third direction, may rotate with respect to the first housing 310 around the hinge 510 (or a hinge shaft 700). The electronic device 101 may be changed to a folded status or an unfolded status, which will be described later with reference to FIGS. 4 and 5.

According to an embodiment, in the electronic device 101, the first surface may face the third surface in a fully folded status, and the third direction may be the same as the first direction in a fully unfolded status.

According to various embodiments, the first housing 310 and the second housing 320 may be disposed on opposite sides around a folding axis A and may have a shape globally symmetrical to the folding axis A. As will be described later, the first housing 310 and the second housing 320 may have different angles or distances from each other, according to whether the status of the electronic device 101 is the unfolded status, the folded status, or the partially unfolded (or partially folded), intermediate status. According to an embodiment, unlike the first housing 310, the second housing 320 may further include the sensor region 324 in which various sensors are disposed, but may have a mutually symmetrical shape in other regions.

According to various embodiments, as shown in FIG. 2, the first housing 310 and the second housing 320 may form a recess accommodating the display 200, together. According to an embodiment, due to the sensor region 324, the recess may have two or more different widths in a direction perpendicular to the folding axis A.

According to an embodiment, the recess may have a first width w1 between a first portion 310a parallel to the folding axis A in the first housing 310 and a first portion 320a formed in a periphery of the sensor region 324 in the second housing 320. The recess may have a second width w2 between a second portion 310b of the first housing 310 and a second portion 320b parallel to the folding axis A without corresponding to the sensor region 324 in the second housing 320. In this case, the second width w2 may be greater than the first width w1. In another example, the first portion 310a of the first housing 310 and the first portion 320a of the second housing 320 having mutually asymmetrical shapes may form the first width w1 of the recess, and the second portion 310b of the first housing 310 and the second portion 320b of the second housing 320 having mutually symmetrical shapes may form the second width w2 of the recess. According to an embodiment, the first portion 320a and the second portion 320b of the second housing 320 may have different distances from the folding axis A. A width of the recess is not limited to the illustrated example. In another example, the recess may have a plurality of widths due to the shape of the sensor region 324 or a portion having the asymmetrical shapes of the first housing 310 and the second housing 320.

According to various embodiments, at least a portion of the first housing 310 and the second housing 320 may be formed of a metal material or a non-metal material having a rigidity of a magnitude selected to support the display 200. At least a portion formed of the metal material may provide a ground plane for the electronic device 101, and may be electrically connected to a ground line formed on a PCB (e.g., a board unit 520 of FIG. 4).

According to various embodiments, the sensor region 324 may be formed to have a certain region in adjacent to one corner of the second housing 320. However, the arrangement, shape, and size of the sensor region 324 are not limited to the illustrated example. For example, in another embodiment, the sensor region 324 may be provided at another corner of the second housing 320 or in any region between top and bottom corners. In one embodiment, components for performing various functions embedded in the electronic device 101 may be exposed to the front surface of the electronic device 101 through the sensor region 324 or through one or more openings provided in the sensor region 324. In various embodiments, the components may include various types of sensors. The sensor may include, for example, at least one of a front camera, a receiver, or a proximity sensor.

According to various embodiments, the first rear cover 380 may be disposed on one side of the folding axis A on the rear surface of the electronic device 101 and may have, for example, a substantially rectangular periphery surrounded by the first housing 310. Similarly, the second rear cover 390 may be disposed on the other side of the folding axis A on the rear surface of the electronic device 101 and may have a periphery surrounded by the second housing 320.

According to various embodiments, the first rear cover 380 and the second rear cover 390 may have substantially symmetrical shapes with respect to the folding axis A. However, the first rear cover 380 and the second rear cover 390 may not necessarily have mutually symmetrical shapes, and in another embodiment, the electronic device 101 may include the first rear cover 380 and the second rear cover 390 having various shapes. In another embodiment, the first rear cover 380 may be formed integrally with the first housing 310, and the second rear cover 390 may be formed integrally with the second housing 320.

According to various embodiments, the first rear cover 380, the second rear cover 390, the first housing 310, and the second housing 320 may form a space in which various components of the electronic device 101 (e.g., a PCB or a battery) may be placed. According to an embodiment, one or more components may be disposed on or visually exposed to the rear surface of the electronic device 101. For example, at least a portion of a sub-display may be visually exposed through a first rear region 382 of the first rear cover 380. In another embodiment, one or more components or sensors may be visually exposed through a second rear region 392 of the second rear cover 390. In various embodiments, the sensor may include a proximity sensor and/or a rear camera.

According to various embodiments, a front camera exposed to the front surface of the electronic device 101 through one or more openings provided in the sensor region 324 or a rear camera exposed through the second rear region 392 of the second rear cover 390 may include one lens or a plurality of lenses, an image sensor, and/or an ISP. A flash may include, for example, a light-emitting diode or a xenon lamp. In an embodiment, two or more lenses (an IR camera, a wide-angle lens, and a telephoto lens) and image sensors may be disposed on a surface of the electronic device 101.

Referring to FIG. 3, the hinge cover 330 may be disposed between the first housing 310 and the second housing 320 to cover internal components (e.g., the hinge 510 of FIG. 4 described later). According to an embodiment, the hinge cover 330 may be covered by a portion of the first housing 310 and the second housing 320 or may be exposed to the outside, according to the state of the electronic device 101 (the unfolded status, the intermediate status, or the folded status).

According to an embodiment, as shown in FIG. 2, when the electronic device 101 is in the unfolded status (e.g., the fully unfolded status), the hinge cover 330 may not be exposed by being covered with the first housing 310 and the second housing 320. In another example, as shown in FIG. 3, when the electronic device 101 is in the folded status (e.g., the fully folded status), the hinge cover 330 may be exposed to the outside between the first housing 310 and the second housing 320. In another example, in the intermediate status where the first housing 310 and the second housing 320 are folded with a certain angle, the hinge cover 330 may be partially exposed to the outside between the first housing 310 and the second housing 320. However, in this case, the exposed region may be smaller than in the fully folded status. In an embodiment, the hinge cover 330 may include a curved surface.

According to various embodiments, the display 200 may be disposed on a space formed by the foldable housing 300. For example, the display 200 may be seated in a recess formed by the foldable housing 300 and may be seen from the outside through the front surface of the electronic device 101. For example, the display 200 may form most of the front surface of the electronic device 101. Thus, the front surface of the electronic device 101 may include the display 200 and a partial region of the first housing 310 and a partial region of the second housing 320, which are adjacent to the display 200. The rear surface of the electronic device 101 may include the first rear cover 380, the partial region of the first housing 310, which is adjacent to the first rear cover 380, the second rear cover 390, and a partial region of the second housing 320, which is adjacent to the second rear cover 390.

According to various embodiments, the display 200 may refer to a display in which at least a partial region may be transformed into a flat surface or a curved surface. According to an embodiment, the display 200 may include the folding region 203, a first region 201 disposed on one side (e.g., the left side of the folding region 203 shown in FIG. 2) with respect to the folding region 203, and a second region 202 disposed on the other side (e.g., the right side of the folding region 203 shown in FIG. 2).

However, region division of the display 200 shown in FIG. 2 is an example, and the display 200 may be divided into a plurality of (e.g., four or more or two) regions depending on a structure or a function. For example, the display 200 may be region-divided by the folding region 203 extending in parallel to a y-axis or by the folding axis A in the embodiment shown in FIG. 2, but the display 200 may be region-divided based on another folding region (e.g., a folding region parallel to an x-axis) or another folding axis (e.g., a folding axis parallel to the x-axis) in another embodiment.

According to various embodiments of the present disclosure, the display 200 may be coupled to or disposed adjacent to a touch panel (e.g., the touch panel 210 of FIG. 6 described later) including a touch sensing circuit and a pressure sensor capable of measuring a strength (a pressure) of a touch. For example, the display 200 may be coupled to or disposed adjacent to a touch panel detecting a stylus pen of an electromagnetic resonance (EMR) type, as an example of the touch panel 210.

According to various embodiments, the first region 201 and the second region 202 may have globally symmetrical shapes around the folding region 203. However, the second region 202, unlike the first region 201, may include a notch that is cut depending on presence of the sensor region 324, but may have a shape symmetrical to the first region 201 in the other regions. In other words, the first region 201 and the second region 202 may include portions having mutually symmetrical shapes and portions having mutually asymmetrical shapes.

Hereinbelow, operations of the first housing 310 and the second housing 320 and regions of the display 200 based on the status of the electronic device 101 (e.g., the folded status, the unfolded status, or the intermediate status) will be described.

According to various embodiments, when the electronic device 101 is in the unfolded status (e.g., FIG. 2), the first housing 310 and the second housing 320 may be disposed to be facing the same direction while forming an angle of 180 degrees. A surface of the first region 201 and a surface of the second region 202 of the display 200 may form 180 degrees with each other, and may be facing the same direction (e.g., in a direction toward the front surface of the electronic device. The folding region 203 may form the same plane as the first region 201 and the second region 202.

According to various embodiments, when the electronic device 101 is in the folded status (e.g., FIG. 3), the first housing 310 and the second housing 320 may be disposed to face each other. The surface of the first region 201 and the surface of the second region 202 of the display 200 may face each other while forming a narrow angle (e.g., between 0 to 10 degrees). At least a portion of the folding region 203 may include a curved surface having a certain curvature.

According to various embodiments, when the electronic device 101 is in the intermediate status, the first housing 310 and the second housing 320 may be disposed at a certain angle. The surface of the first region 201 and the surface of the second region 202 of the display 200 may form an angle greater than that in the folded status and less than that in the unfolded status. The folding region 203 may include a curved surface, at least a portion of which has a certain curvature less than a curvature in the folded status.

Figure 4:
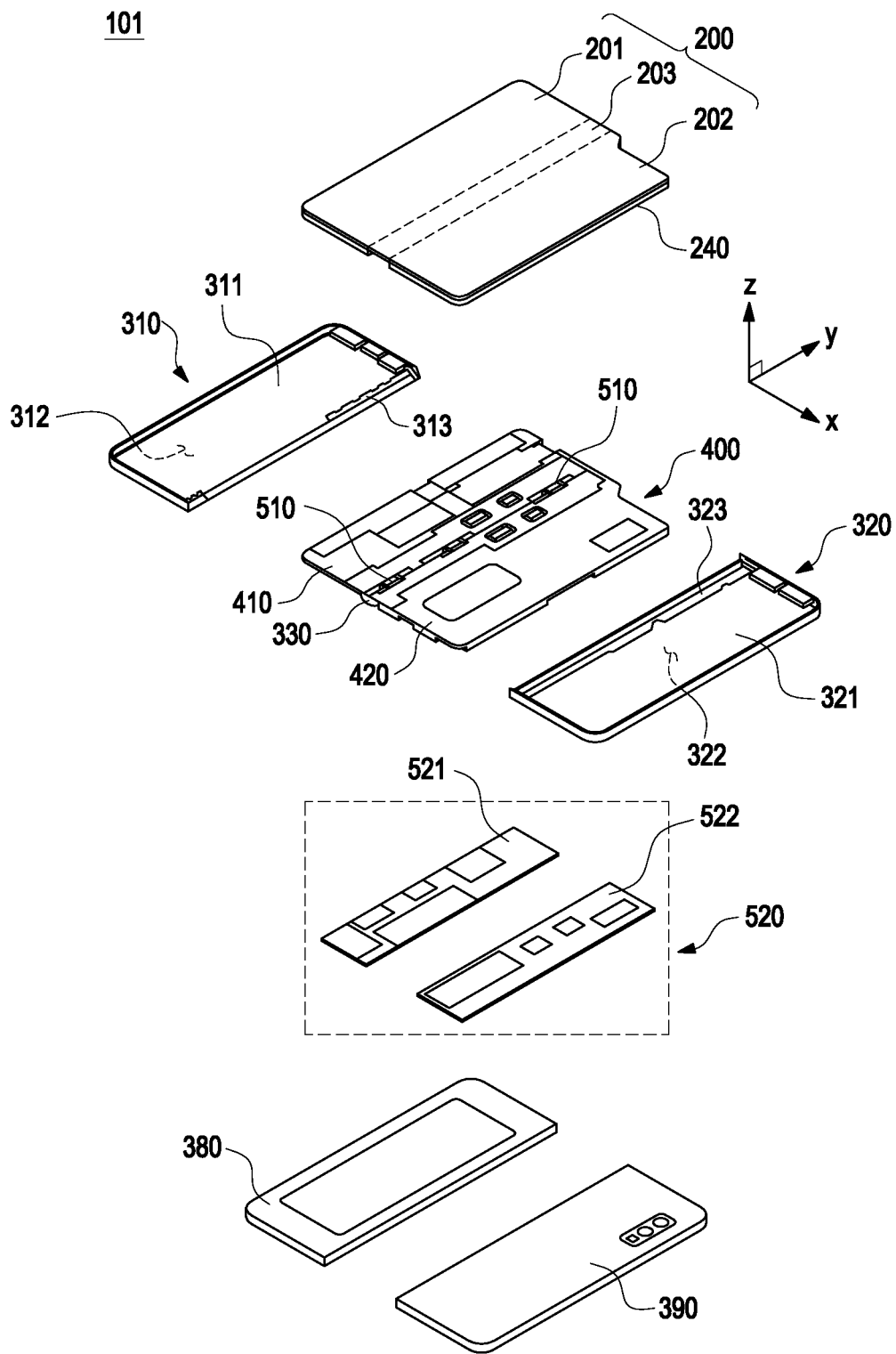
FIG. 4 is an exploded perspective view of an electronic device, according to various embodiments of the present disclosure.

FIG. 4 is an exploded perspective view of the electronic device 101, according to various embodiments of the present disclosure.

Referring to FIG. 4, in various embodiments, the electronic device 101 may include the foldable housing 300, the display 200, and the board unit 520. The foldable housing may include the first housing 310, the second housing 320, a bracket assembly 400, the first rear cover 380, the second rear cover 390, and the hinge 510.

According to various embodiments, the display 200 may include a display panel (e.g., display panel 200c of FIG. 6) (e.g., a flexible display panel) and one or more plates or layers (e.g., a support plate 240) on which the display panel 200c is seated. In an embodiment, the support plate 240 may be disposed between the display panel 200c and the bracket assembly 400. An adhesive structure (not shown) may be positioned between the support plate 240 and the bracket assembly 400 to adhere the support plate 240 to the bracket assembly 400.

According to various embodiments, the bracket assembly 400 may include a first bracket assembly 410 and a second bracket assembly 420. Between the first bracket assembly 410 and the second bracket assembly 420, the hinge 510 may be disposed and the hinge cover 330 covering the hinge 510 may be disposed when the hinge 510 is viewed from the outside. In another example, a PCB (e.g., a flexible printed circuit (FPC)) may be disposed to cross the first bracket assembly 410 and the second bracket assembly 420.

According to various embodiments, the board unit 520 may include a first main circuit board 521 disposed in the first bracket assembly 410 side and a second main circuit board 522 disposed in the second bracket assembly 420 side. The first main circuit board 521 and the second main circuit board 522 may be disposed inside a space formed by the bracket assembly 400, the first housing 310, the second housing 320, the first rear cover 380, and the second rear cover 390. Components for implementing various functions of the electronic device 101 may be mounted on the first main circuit board 521 and the second main circuit board 522.

According to various embodiments, the first housing 310 and the second housing 320 may be assembled with each other to be coupled to opposite sides of the bracket assembly 400 in a status where the display 200 is coupled to the bracket assembly 400. For example, the first housing 310 and the second housing 320 may be coupled to the bracket assembly 400 by sliding in the opposite sides of the bracket assembly 400.

According to an embodiment, the first housing 310 may include the first surface 311, the second surface 312 facing a direction opposite to the first surface 311, and the second housing 320 may include the third surface 321 and the fourth surface 322 facing a direction opposite to the third surface 321. According to an embodiment, the first housing 310 may include a first rotation support surface 313, and the second housing 320 may include a second rotation support surface 323 corresponding to the first rotation support surface 313. The first rotation support surface 313 and the second rotation support surface 323 may include curved surfaces corresponding to the curved surface included in the hinge cover 330.

According to an embodiment, when the electronic device 101 is in the unfolded state (e.g., the electronic device of FIG. 2), the first rotation support surface 313 and the second rotation support surface 323 may cover the hinge cover 330, such that the hinge cover 330 may not be exposed to the rear surface of the electronic device 101 or may be minimally exposed. In another example, when the electronic device 101 is in the folded state (e.g., the electronic device 101 of FIG. 3), the first rotation support surface 313 and the second rotation support surface 323 may rotate along the curved surface included in the hinge cover 330 to maximally expose the hinge cover 330 to the rear surface of the electronic device 101.

Figure 5A:
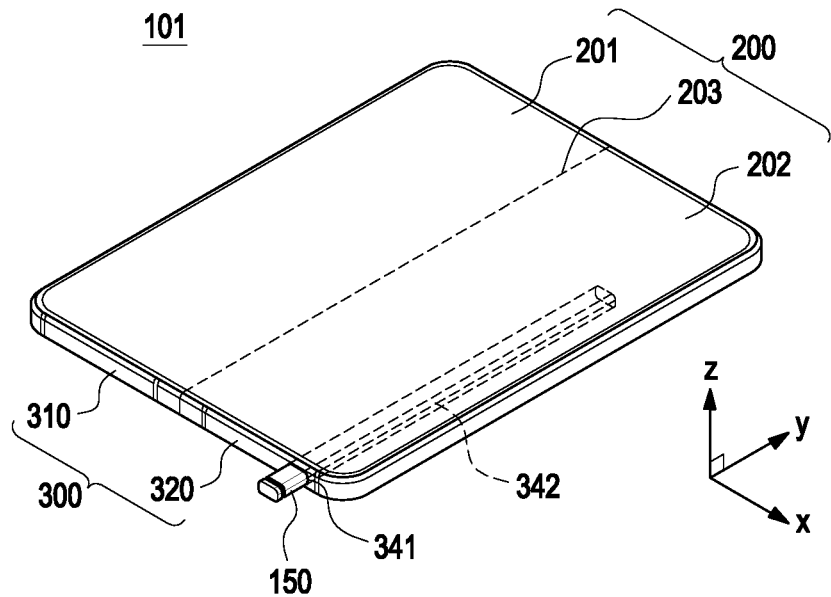
FIG. 5A is a perspective view showing an example of a fully unfolded status of an electronic device, according to some embodiments.
Figure 5B:
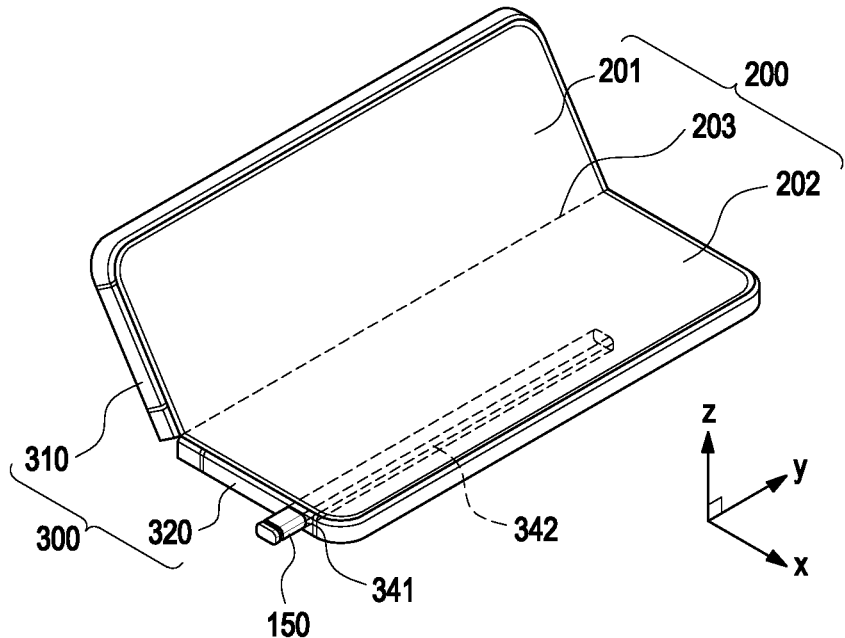
FIG. 5B is a perspective view showing an example of a partially unfolded, intermediate status of an electronic device, according to some embodiments.

FIG. 5 is a perspective view showing an example of the fully unfolded status or the partially unfolded, intermediate status of the electronic device 101, according to some embodiments. Specifically, FIG. 5A shows the fully unfolded status of the electronic device 101, and FIG. 5B shows the partially unfolded, intermediate status of the electronic device 101. Referring to FIG. 5, the electronic device 101 may include the foldable housing 300 and the display 200. The electronic device 101 may be changed to the folded status or the unfolded status. The electronic device 101 may be folded in two types of 'in-folding' where the front surface of the electronic device 101 forms an acute angle and 'out-folding' where the front surface of the electronic device 101 forms a dull angle, when the electronic device 101 is viewed from a hinge-axis direction (e.g., a direction parallel to the y-axis). For example, the first surface (e.g., first surface 311 of FIG. 4) may face the third surface (e.g., third surface 321 of FIG. 4) when the electronic device 101 is folded in the in-folding type, and the third direction may be the same as the first direction in the fully unfolded status. Also, for example, when the electronic device 101 is folded in the out-folding type, a second surface (e.g., the second surface 312 of FIG. 4) may face a fourth surface (e.g., the fourth surface 322 of FIG. 4).

In addition, although not shown in the drawing, the electronic device 101 may include a plurality of hinge axes (e.g., two parallel hinge axes including an axis A of FIG. 2 and the other axis parallel to the axis A), and in this case, the electronic device 101 may be folded in a 'multi-folding' type in which the in-folding type and the out-folding type are combined.

The in-folding type may refer to a status in which the display 200 is not exposed to the outside in the fully folded status. The out-folding type may refer to a status in which the display 200 is exposed to the outside in the fully folded status. FIG. 5B illustrates the partially unfolded, intermediate status in a process where the electronic device 101 is in-folded.

Hereinbelow, a description will be made of a status where the electronic device 101 is folded in the in-folding type for convenience, but it should be noted that this description may also be applied to a status in which the electronic device 101 is folded in the out-folding type.

According to various embodiments, the display 200 may have a rectangular shape with rounded corners and a very narrow bezel region.

The flexible display 200 may include the first region 201 disposed in the first housing 310 and the second region 202 disposed in the second housing 320, in which the first region 201 and the second region 202 may be implemented in the same shape. A boundary between the first region 201 and the second region 202 of the electronic device 101 may be formed based on the folding region 203.

Other components of the electronic device 101 of FIG. 5 may adopt the components of the electronic device 101 of FIGS. 1 through 4.

The user may perform an input operation through a part of a body (e.g., a hand) on the first region 201 or the second region 202 or may perform an input operation using the input device 150.

Referring to FIG. 5, a hole 341 may be formed in a portion of the foldable housing 300 of the electronic device 101, for example, a portion of a side surface, according to various embodiments of the present disclosure. According to various embodiments, the foldable housing 300 may further include a receiving space 342 exposed to the outside through the hole 341, and the input device 150 (e.g., a stylus pen) may be inserted into the electronic device 101 through the receiving space 342.

Figure 6A:
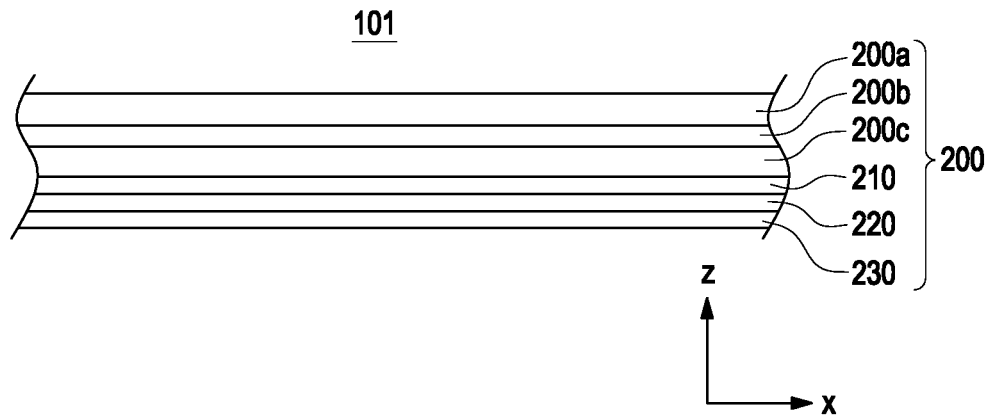
FIG. 6A is a cross-sectional view showing a side surface of an example of a fully unfolded status of a display part, according to some embodiments.
Figure 6B:
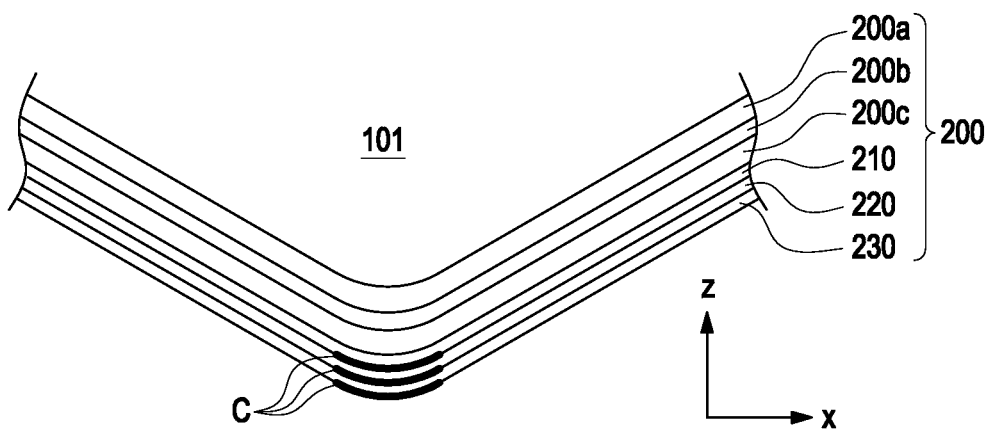
FIG. 6B is a cross-sectional view showing a side surface of an example of a partially unfolded, intermediate status of a display part, according to some embodiments.

FIG. 6 is a cross-sectional view showing a side surface of an example of the fully unfolded status or the partially unfolded, intermediate status of a display part, according to some embodiments. Specifically, FIG. 6A may indicate a status in which the display part is fully unfolded, and FIG. 6B may indicate a status in which the display part is partially unfolded (or partially folded).

The display part of the electronic device 101 may include a component displaying a screen through the display 200 and a component moving integrally with the display by being connected to the display. Referring to FIG. 6A, the display part may include the display panel 200c and the touch panel 210 disposed adjacent to the display panel 200c.

According to some embodiments, the display 200 may include the display panel 200c, a polarization layer 200b disposed on the display panel 200c, and a window member 200a forming an exterior of the display. The display panel 200c, the polarization layer b, and the window member 200a may form one display 200 and may be formed of a flexible material. Thus, when an external force is applied to the display 200 shown in FIG. 6A, the display 200 may be bent as shown in FIG. 6B. The electronic device 101 may detect an input (e.g., an input from the user or an input made through the input device 150 of FIG. 5) on a surface of the display 200 by using the touch panel 210. Herein, the input recognizable by the touch panel 210 may include an input made using hovering as well as an input made through a direct contact with the surface of the display 200. According to an embodiment, the touch panel 210 may be formed with substantially the same size as the display 200 and may be disposed adjacent to the display 200. According to various embodiments, the touch panel 210 may be disposed on a top surface or a rear surface of the display 200. As an embodiment, FIG. 6 shows a status in which the touch panel 210 is attached to the rear surface of the display 200. In the following description, it should be noted that a description is made based on the touch panel 210 being disposed on the rear surface of the display 200 with reference to FIG. 6, but the present disclosure is not limited thereto.

According to an embodiment, the display 200 may be made of a material that at least partially transmits radio waves or a magnetic field. The display panel 200c and/or the touch panel 210 may be mounted on the display 200. Thus, the display 200 may be used as an output device outputting a screen and an input device having a touch screen function. The display panel 200c may include a display element layer including at least one pixel(s) and a thin-film transistor (TFT) layer connected to the display element layer. According to various embodiments, the display panel 200c may correspond to a panel such as a liquid crystal display (LCD), a light-emitting diode (LED), or an active matrix organic light-emitting diode (AMOLED), and may display various images corresponding to various operating statuses, application execution, contents of the electronic device 101, etc.

According to various embodiments, as the touch panel 210, various types of touch panels may be included. For example, various types of touch panels, such as a capacitive touch panel sensing changes in capacitance, a pressurized touch panel sensing a position by sensing pressure acting on the panel, an optical touch panel using infrared rays, and a transparent electrode type touch panel using a contact point of a transparent conductive film, may be used. In addition, various types of input position sensing panels not mentioned above, such as an electromagnetic resonance (EMR) type touch panel, may be used.

For example, when a digitizer panel is used as the touch panel 210, the touch panel may include a pattern layer on which a transmission pattern (e.g., a Tx pattern) is formed and a pattern layer on which a reception pattern (e.g., an Rx pattern) is formed, and these Tx pattern and Rx pattern may be stacked with each other to generate/sense an electromagnetic field. According to an embodiment, by using the digitizer panel, a magnetic field generated from an electromagnetic inductor (an input device, for example, a stylus pen) may be detected in the EMR type and various motions such as approach, click, and drag of the electromagnetic inductor may be detected.

According to various embodiments, the display part may further include the magnetic shielding member 220 and the protection member 230 on the rear surface of the touch panel 210. According to an embodiment, the magnetic shielding member 220 may be disposed on the rear surface of the touch panel 210. The magnetic shielding member 220 may be made by applying, for example, magnetic metal powder (MMP) to the rear surface of the touch panel 210. The electronic device 101 may shield a magnetic force of peripheral parts (e.g., other electronic parts inside the foldable housing 300), which may be recognized as noise except for a signal input from the stylus pen, by using the magnetic shielding member 220.

According to an embodiment, the protection member 230 may be further disposed on the rear surface of the touch panel 210. The protection member 230 may include, for example, any one of at least one adhesive layer, at least one cushion layer, and at least one heat-dissipation layer, or a combination of at least two of the at least one adhesive layer, the at least one cushion layer, and the at least one heat-dissipation layer. Herein, the at least one cushion layer may be such that for example, an emboss pattern is formed to absorb a physical shock acting on the panel. The at least heat-dissipation layer may be an element for dissipating heat generated in the display panel 200c and/or the touch panel 210 to an outside, and at least a part thereof may include a metal material (e.g., graphite+copper (Cu) foil).

According to one embodiment, the magnetic shielding member 220 and/or the protection member 230 may be formed with substantially the same area as the display panel 200c like the touch panel 210, and may be attached to the rear surface of the display panel 200c and may be used.

In the foregoing embodiments, the touch panel 210, the magnetic shielding member 220, and/or the protection member 230 may be vulnerable to a physical shock or an external force. Therefore, when the display 200 is a flexible display, a bent portion C of the touch panel 210, the magnetic shielding member 220, and/or the protection member 230 disposed in the folding region of the display 200 may have various types of damages (e.g., cracks, ruptures) after a certain period of use.

Figure 7A:
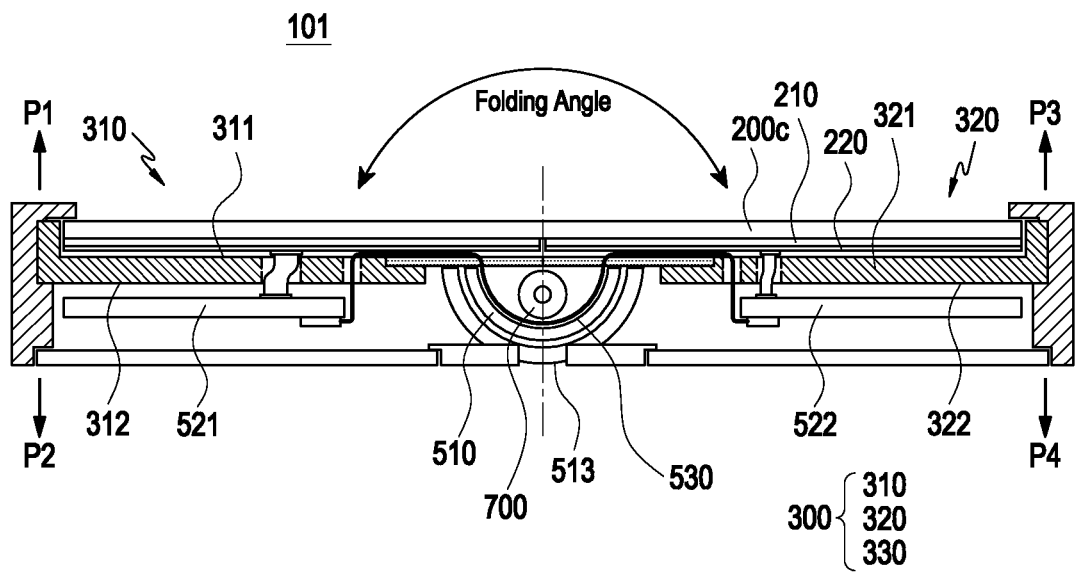
FIG. 7A is a cross-sectional view schematically showing a side cross-section of an electronic device in a fully unfolded status, according to various embodiments of the present disclosure.
Figure 7B:
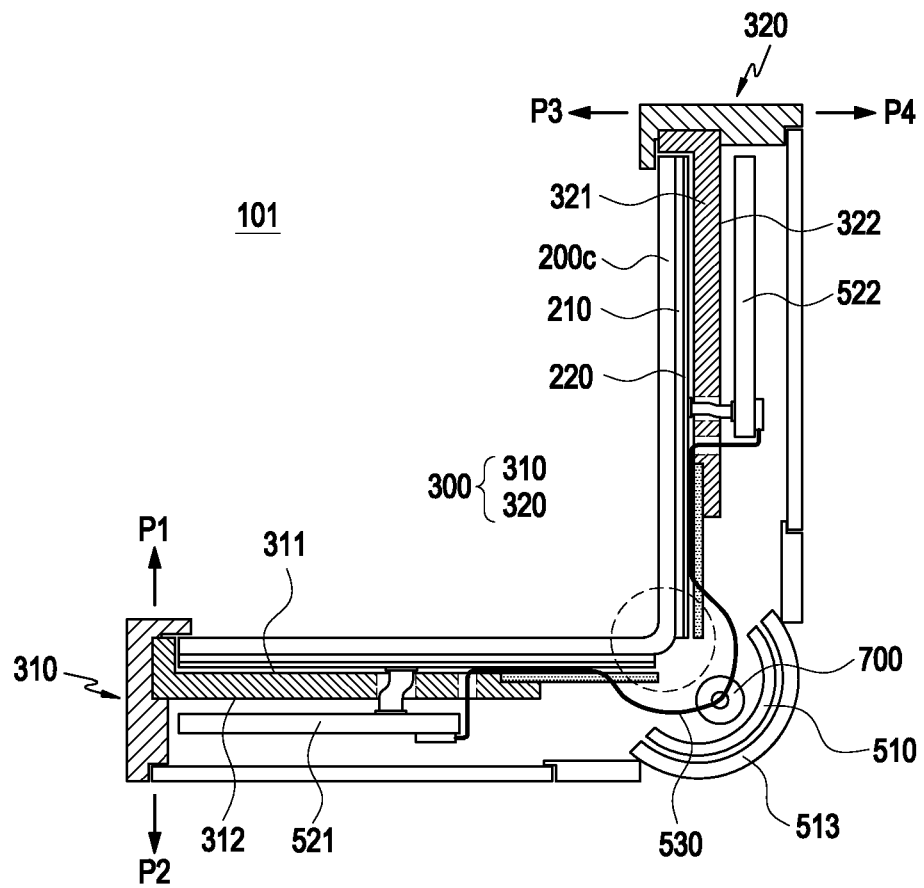
FIG. 7B is a cross-sectional view schematically showing a side cross-section of an electronic device in a partially unfolded, intermediate status, according to various embodiments of the present disclosure.

FIG. 7A is a cross-sectional view schematically showing a side cross-section of the electronic device 101 in the unfolded status, according to various embodiments of the present disclosure. FIG. 7B is a cross-sectional view schematically showing a side cross-section of the electronic device 101 in the partially unfolded, intermediate status, according to various embodiments of the present disclosure.

Referring to FIGS. 7A and 7B together, the electronic device 101 may include the foldable housing 300, the display panel 200c, and the touch panel 210. According to various embodiments, the foldable housing 300 and the display panel 200c may have the same structure in part or entirely as the foldable housing 300 and the display panel 200c of FIGS. 2 to 5.

According to various embodiments, the foldable housing 300 may include a hinge 510, the first housing 310, and the second housing 320. The foldable housing 300 may be configured such that the second housing 320 is rotatable with respect to the first housing 310. Depending on a rotation operation, there may be the folded status where the first housing 310 and the second housing 320 face each other, the unfolded status where the first housing 310 and the second housing 320 are unfolded in parallel, being facing the same direction, or the intermediate status where the first housing 310 and the second housing 320 maintain a specified angle. FIG. 7A shows the unfolded status (e.g., a flat status), and FIG. 7B shows the intermediate status.

Referring to FIG. 7A, the first housing 310 may include the first surface 311 facing a first direction P1 and the second surface 312 facing a second direction P2 that is opposite to the first direction P1. The second housing 320 may include the third surface 321 facing a third direction P3 and the fourth surface 322 facing a fourth direction P4 that is opposite to the third direction P3. For reference, in FIG. 7A, the first direction P1 may be parallel to a direction component Z shown in FIGS. 4 through 6.

The first direction P1 and the third direction P3 may form an acute angle with each other through rotation (e.g., in-folding) of the hinge 510. For example, as shown in FIG. 7B, the first direction P1 and the third direction P3 may be perpendicular to each other. In another example, the second direction P2 and the fourth direction P4 may form a dull angle with each other through rotation (e.g., out-folding) of the hinge 510.

In the foldable housing 300, the first surface 311 may face the third surface 321 in the fully folded status using the in-folding type, and the third direction P3 may be the same as the first direction P1 in the fully unfolded status.

According to various embodiments, the electronic device 101 may further include a bracket assembly (e.g., the bracket assembly 400 of FIG. 4) supporting the display 200. While the bracket assembly 400 is not shown in FIGS. 7A and 7B, the bracket assembly 400 may be disposed on the rear surface and/or the side surface of the display 200 to surround and support at least a part of the window member 200a and the display panel 200c. The bracket assembly 400 may include one or more plates on which the display 200 is seated, and may be, for example, a sus plate made of a sus material. According to an embodiment, the bracket assembly 400 may be disposed between the display 200 and a rear plate (e.g., the first rear cover 380 and the second rear cover 390 of FIG. 4). For example, the bracket assembly 400 may include a first bracket assembly (e.g., the first bracket assembly 410 of FIG. 4) and a second bracket assembly (e.g., the second bracket assembly 420 of FIG. 4) that are disposed spaced apart from each other. The first bracket assembly 410 may be disposed to face the first surface 311 of the first housing 310, and the second bracket assembly 420 may be disposed to face the third surface 321 of the second housing 320. According to one embodiment, the bracket assembly 400 may be integrally formed with the foldable housing 300 of the present disclosure, and may correspond to some of the components of the foldable housing 300.

The display 200 may be disposed to face the front surface of the electronic device 101 when the electronic device 101 is fully unfolded, on the first surface 311 of the first housing 310 and the third surface 321 of the second housing 320. Thus, the display 200 may be recognized through the front surface of the electronic device 101, when viewed from the outside. As shown in FIG. 7A, the display 200 may be viewed from the outside through at least one surface of the foldable housing.

The first main circuit board 521 and the second main circuit board 522 may be disposed inside the first housing 310 and the second housing 320, respectively. The first main circuit board 521 and the second main circuit board 522 may be electrically connected to each other by at least one FPCB 530 and/or a connector to transmit/receive signals between them. According to an embodiment, as shown in FIG. 7B, even when the electronic device 101 is partially folded around the hinge shaft 700, the at least one FPCB 530 in the folding region may be designed to be flexibly bent.

Referring to FIGS. 7A and 7B together, the hinge 510 may change relative position and angle between the first housing 310 and the second housing 320 in the folding process. During an operation of the hinge 510, an internal mechanism of the folding region including the hinge 510 may be covered by the hinge cover 513 (e.g., the hinge cover 330 of FIG. 3).

Figure 8:
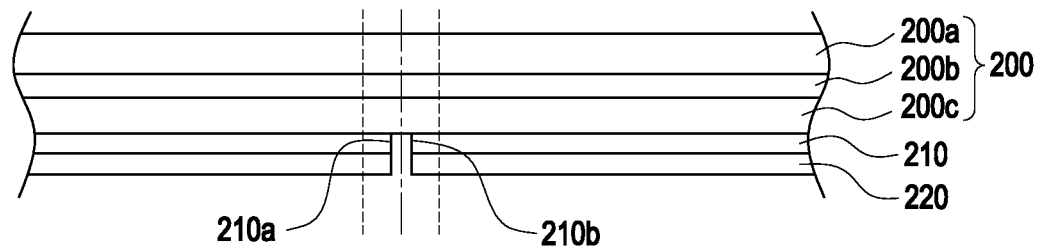
FIG. 8 is a cross-sectional view schematically showing an unfolded status of a display part, according to various embodiments of the present disclosure.

FIG. 8 is a cross-sectional view schematically showing the unfolded status of the display part, according to various embodiments of the present disclosure.

According to various embodiments, the display 200 may extend from the first surface (e.g., the first surface 311 in FIG. 7A) to the third surface (e.g., the third surface 321 in FIG. 7A).

Referring to FIG. 8, the display 200 may include the window member 200a, the polarization layer 200b, and the display panel 200c.

According to an embodiment, at least a part of the window member 200a may be made of a substantially transparent material. For example, the at least a part of the window member 200a may be formed of a glass plate including various coating layers, or a polymer plate. According to an embodiment, the polarization layer 200b may allow a screen displayed on the display panel 200c or light of a specific wavelength in the amount of light incident on the display panel 200c to pass therethrough. According to an embodiment, the display panel 200c may be exposed through a significant portion of the window member 200a.

The touch panel 210 and the magnetic shielding member 220 may be disposed under the display panel 200c. While the protection member 230 is omitted for convenience of description in FIG. 8, the following description including FIG. 8 may be applied to an embodiment including the protection member 230.

Figure 9A:
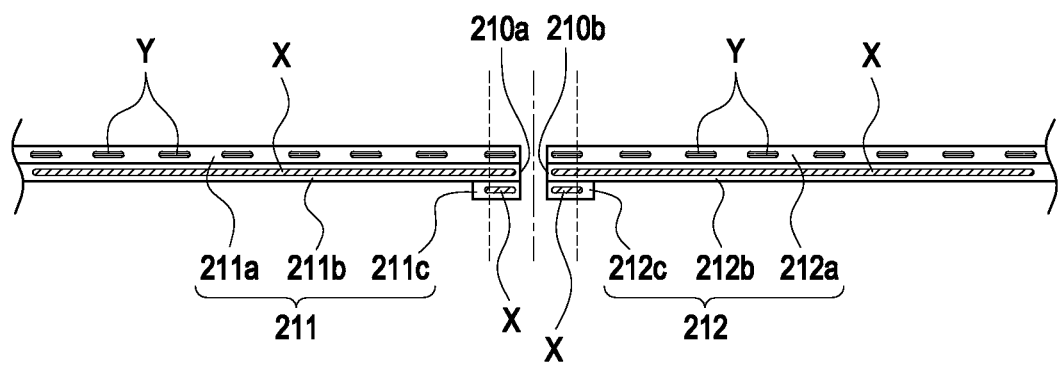
FIG. 9A is a cross-sectional view schematically showing an example of a touch panel, according to various embodiments of the present disclosure.

According to various embodiments of the present disclosure, the touch panel 210 may be a dual-type touch panel. Two touch panels 210 may be disposed under the display 200, and may be disposed spaced apart by a certain distance with surfaces 210a and 210b facing each other with respect to the folding region of the display 200, respectively. According to an embodiment, the magnetic shielding member 220 may also be configured as a dual type, such that the two magnetic shielding members 220 may be respectively disposed under the two touch panels 210. FIG. 9A is a cross-sectional view schematically showing an example of the touch panel 210, according to various embodiments of the present disclosure.

According to various embodiments of the present disclosure, the dual-type touch panel 210 may include a first touch panel 211 disposed adjacent to a first surface (e.g., the first surface 311 of FIG. 7A) of a first housing (e.g., the first housing 310 of FIG. 7A) and a second touch panel 212 disposed adjacent to a third surface (e.g., the third surface 321 of FIG. 7B) of a second housing (e.g., the second housing 320 of FIG. 7B).

Each of the first touch panel 211 and the second touch panel 212 may include a plurality of layers. For example, the first touch panel 211 may include a first layer 211a where a pattern (e.g., a plurality of first conductive lines) is formed, and a second layer 211b where a pattern (e.g., a plurality of second conductive lines) different from the pattern formed on the first layer 211a is formed. The second touch panel 212 may also include a first layer 212a where a pattern is formed, and a second layer 212b where a pattern different from the pattern formed on the first layer 212a is formed. According to various embodiments, the first layer 211a and the second layer 211b of the first touch panel 211 may be referred to as a first-first layer and a first-second layer, respectively, and the first layer 212a and the second layer 212b of the second touch panel 212 may be referred to as a second-first layer and a second-second layer, respectively.

According to various embodiments, on the first touch panel 211, a conductive pattern extending in a fifth direction perpendicular to the first direction (e.g., a direction parallel to the direction component Z of FIGS. 4 through 6) or the third direction may be formed on the first layer 211a and a conductive pattern extending in a sixth direction perpendicular to the fifth direction may be formed in the same plane as a plane (e.g., a virtual plane) to which the fifth direction belongs, on the second layer 211b of the first touch panel 211.

According to various embodiments, the fifth direction and the sixth direction may be formed to be oriented parallel to a longitudinal direction (or a vertical direction) and a width direction (or a horizontal direction) of the touch panel, respectively. For example, the fifth direction may be a direction parallel to a direction component Y of FIGS. 4 to 6, and the sixth direction may be a direction parallel to a direction component X of FIGS. 4 to 6. In describing various embodiments of the present disclosure, it should be noted that although the fifth and sixth directions are parallel to the direction components Y and X as a main example, the present disclosure is not necessarily limited thereto.

Referring to FIG. 9A, a plurality of Y-axis conductive patterns Y may be formed on the first layer 211*a* of the first touch panel 211. Also, although not shown in the cross-section of FIG. 9A, a plurality of X-axis conductive patterns X perpendicular to the Y-axis may be formed on the second layer 211*b*. The plurality of Y-axis conductive patterns Y may be a plurality of conductive patterns elongated in a direction parallel to the direction component Y. Likewise, the plurality of X-axis conductive patterns X may be a plurality of conductive patterns elongated in a direction parallel to the direction component Y. In the second touch panel 212, the plurality of Y-axis conductive patterns Y may be formed on the first layer 212*a*, and the plurality of X-axis conductive patterns X perpendicular to the Y-axis may be formed on the second layer 212*b*. In the above-described embodiments, the plurality of Y-axis conductive patterns Y may be formed in parallel to each other, and the plurality of X-axis conductive patterns X may also be formed in parallel to each other.

According to an embodiment, for the first touch panel 211 and the second touch panel 212, the Y-axis conductive patterns Y formed on the first layers 211*a* and 212*a* and the X-axis conductive patterns X formed on the second layers 211*b* and 212*b* may be formed stacked on adjacent layers. In addition, the Y-axis conductive patterns Y formed on the first layers 211*a* and 212*a* and the X-axis conductive patterns X formed on the second layers 211*b* and 212*b* may form a conductive loop pattern as a whole by being electrically connected through a conductive via (not shown). The conductive loop pattern (loop) may generate a magnetic field inside a loop for an input electrical signal, and thus may be defined as an EMR coil.

According to various embodiments of the present disclosure, the first layers 211*a* and 212*a* may not necessarily have the Y-axis conductive patterns Y and the second layers 211*b* and 212*b* may not necessarily have the X-axis conductive patterns X. Unlike the foregoing embodiment, the first layers 211*a* and 212*a* may have the X-axis conductive patterns X and the second layers 211*b* and 212*b* may have the Y-axis conductive patterns Y.

Figure 9B:
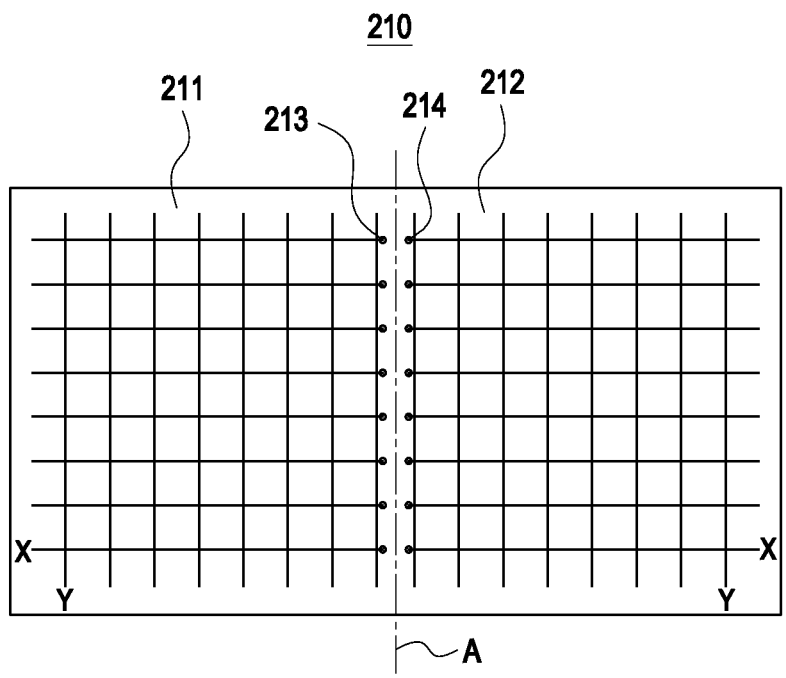
FIG. 9B is a front view schematically showing an example of a touch panel, according to an embodiment of the present disclosure.
Figure 9C:
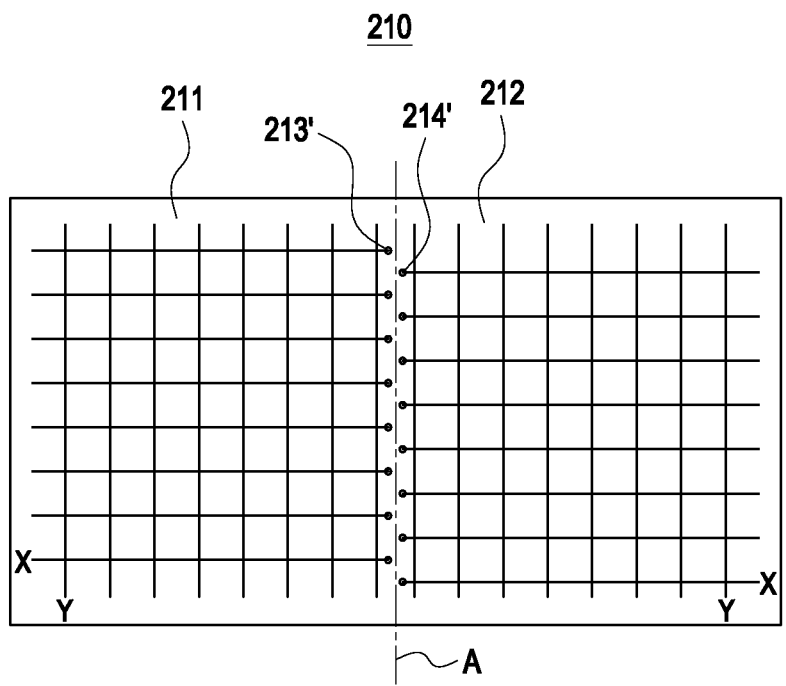
FIG. 9C is a front view schematically showing an example of a touch panel, according to another embodiment of the present disclosure.

FIG. 9B is a front view schematically showing an example of the touch panel 210, according to an embodiment of the present disclosure. FIG. 9C is a front view schematically showing an example of the touch panel 210, according to another embodiment of the present disclosure.

According to an embodiment, conductive patterns having a structure symmetrical to the first touch panel 211 around the folding region may be formed on the second touch panel 212.

Referring to FIG. 9B, when the dual-type touch panel 210 is adopted, a pattern formed on the second touch panel 212 may be designed to be symmetrical to a pattern of the first touch panel 211 around the folding region to provide a uniform electromagnetic field in a use environment of the electronic device (e.g., electronic device 101 of FIG. 7A).

For example, when the first layer 211*a* of the first touch panel 211 has the conductive patterns Y that are parallel to the Y-axis (e.g., the Y-axis of FIG. 5), the first layer 212*a* of the second touch panel 211 may also have the conductive patterns Y that are parallel to the Y-axis (e.g., the Y-axis of FIG. 5).

In another example, unlike shown in the drawing, the first layer 211*a* of the first touch panel 211 may have conductive patterns formed at an angle to the Y-axis (e.g., the Y-axis of FIG. 5). In this case, the first layer 212*a* of the second touch panel 211 may also have the conductive patterns Y that are formed obliquely to the Y-axis and that are symmetrical to the patterns formed on the first touch panel 211 around the folding region.

According to another embodiment, conductive patterns having a structure asymmetrical around the folding region to the conductive patterns formed on the first touch panel 211 may be formed on the second touch panel 212. For example, referring to FIG. 9C, a pattern structure formed to alternate with the pattern formed on the first touch panel 211 around the folding region may be provided in the second touch panel. The pattern formed on the first touch panel 211 and the pattern formed on the second touch panel 212 may be parallel to each other, but the pattern (or the plurality of first conductive lines) formed on the first touch panel 211 may be disposed to alternate with the pattern (or the plurality of second conductive lines) formed on the second touch panel 212. In this case, a distance between the pattern formed on the first touch panel 211 and the pattern formed on the second touch panel 212 may be further reduced, thereby improving an input recognition rate in the vicinity of the folding axis A (or the folding region 203 of FIG. 2).

For example, in the first touch panel 211 and the second touch panel 212 according to various embodiments of the present disclosure, a conductive via may be formed adjacent to the folding axis A, and a minimum space that needs to be physically secured to form a via hole may be required. As shown in FIG. 9B, a via 213 formed in an end portion of conductive patterns parallel to the X-axis near the folding axis A in the first touch panel 211 and a via 214 formed in an end portion of conductive patterns parallel to the X-axis near the folding axis A in the second touch panel 212 may be formed in positions symmetrical to each other around the folding axis A. Herein, the via 213 and the via 214 may be formed spaced apart by a designated distance.

In contrast to the embodiment shown in FIG. 9B, referring to FIG. 9C, a via 213' formed in an end portion of conductive patterns parallel to the X-axis near the folding axis A in the first touch panel 211 and a via 214' formed in an end portion of conductive patterns parallel to the X-axis near the folding axis A in the second touch panel 211 may be formed in positions alternating with each other around the folding axis A. A distance between the via 213' and the via 214' may be shorter than a distance between the via 213 and the via 214 according to the embodiment shown in FIG. 9B.

Referring to the embodiments shown in FIGS. 9B and 9C together, conductive patterns symmetrical to each other around the folding axis A may be provided in the first touch panel 211 and the second touch panel 212, but by providing conductive patterns alternately formed around the folding axis A according to the embodiment, an input recognition rate in the folding region (e.g., the folding region 203 of FIG. 2) may be improved.

Meanwhile, referring back to FIG. 9A, the first touch panel 211 according to various embodiments may further include a third layer 211*c* in addition to the first layer 211*a* where Y-axis (or X-axis) conductive patterns are formed and the second layer 211b where X-axis (or Y-axis) conductive patterns are formed. The third layer 211c may be disposed adjacent to the folding region (e.g., the folding region 203 of FIG. 2) of the foldable housing (e.g., the foldable housing 300 of FIG. 2) on the rear surface of the second layer 211b. The second touch panel 212 having a pattern aspect symmetrical to the first touch panel 211 may also include a third layer 212c. According to various embodiments, the third layer 211c of the first touch panel 211 may be referred to as a first-third layer, and the third layer 212c of the second touch panel 212 may be referred to as a second-third layer.

As the touch panel 210 further includes the third layers 211c and 212c, it is possible to improve the degree of freedom in conductive pattern designing of the first layers 211a and 212a and the second layers 211b and 212b where the Y-axis or X-axis conductive patterns are formed. For example, when the dual-type touch panel 210 is used, the X-axis conductive pattern crossing the touch panel 210 may be disconnected near the folding region, and for this reason, in this vicinity, the density of the electromagnetic field may be reduced compared to the single-type touch panel 210. According to various embodiments of the present disclosure, by further disposing the third layers 211c and 212c, the X-axis conductive patterns may be formed as close as possible to (or in close contact with) the edge region of the disconnected portion of the first touch panel 211 and the second touch panel 212, it is possible to prevent a decrease in the density of the electromagnetic field when the dual-type touch panel 210 is used.

According to various embodiments, the first layers 211a and 212a and the second layers 211b and 212b may be formed to have substantially the same size as a total size of the first touch panel 211 or the second touch panel 212. And as shown in FIG. 9A, the third layers 211c and 212c may be formed with a smaller size than the first layers 211a and 212a and the second layers 211b and 212b in adjacent to the folding region of the foldable housing.

Figure 10A:
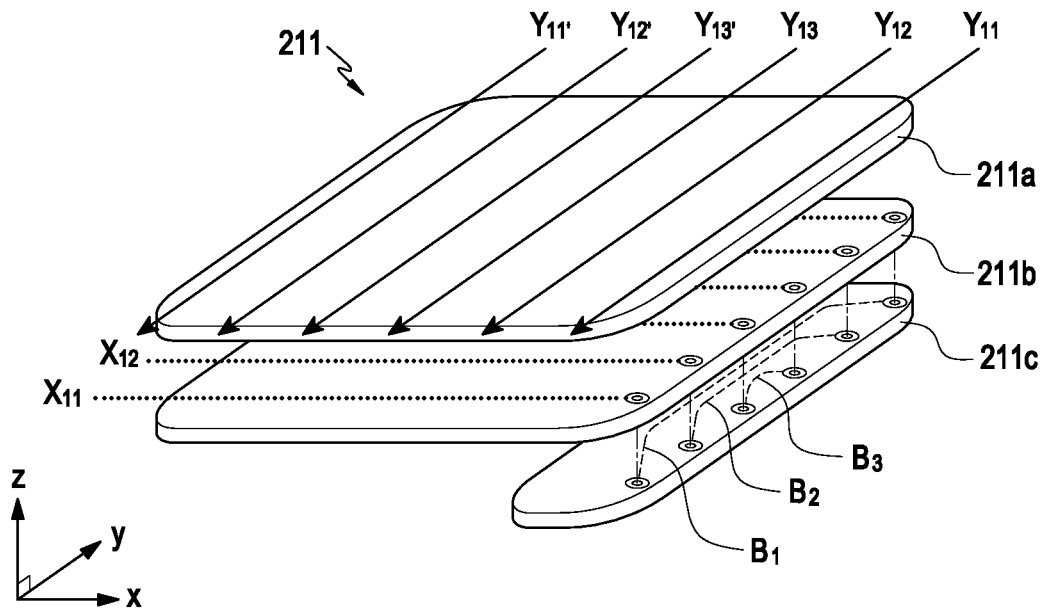
FIG. 10A is an exploded perspective view showing a touch panel on which a conductive pattern is formed, according to various embodiments of the present disclosure.
Figure 10B:
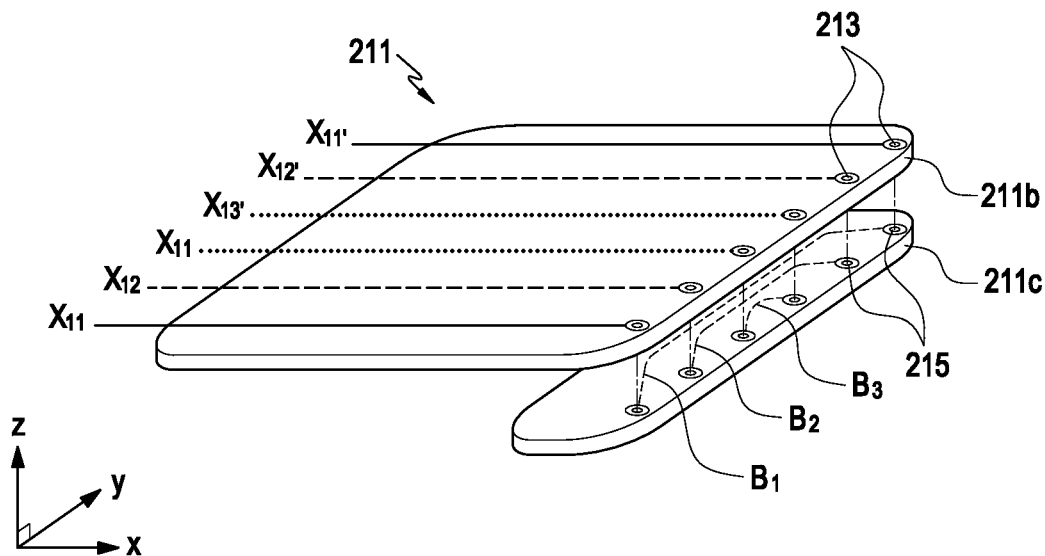
FIG. 10B is an exploded perspective view showing a touch panel on which a conductive pattern is formed, according to various embodiments of the present disclosure.

FIG. 10 is an exploded perspective view showing the first touch panel 211 on which a conductive pattern is formed, according to various embodiments of the present disclosure. More specifically, FIG. 10A shows the first touch panel 211 including the first layer 211a, the second layer 212b, and the third layer 212c, and FIG. 10B simply shows the second layer 212b and the third layer 212c of the first touch panel 211. In the embodiment shown in FIG. 10, Y-axis conductive patterns Y11, Y12, Y13, Y13', Y12', and Y11' are formed on the first layer 211a, and X-axis conductive patterns X11, X12, X13, X13', X12', and X11' are formed on the second layer 211b. However, it should be noted that the Y-axis conductive patterns and the X-axis conductive patterns shown in FIG. 10 are merely examples of various conductive patterns and may be applicable to other various embodiments.

Referring to FIG. 10A, the first layer 211a, the second layer 211b, and the third layer 211c of the first touch panel 211 may be stacked sequentially from top on the first surface (e.g., first surface 311 of FIG. 7A) of the first housing (e.g., first housing 310 of FIG. 7A). Referring to FIGS. 10A and 10B together, the third layer 211c may have a shape elongated in a longitudinal direction (or a vertical direction) of the second layer 211b and may be disposed under the second layer 211b. A plurality of first via holes 213 may be formed adjacent to the folding region of the foldable housing (e.g., foldable housing 300 of FIG. 5) in the second layer 211b, and a plurality of second via holes 215 may be formed in positions corresponding to positions in which the plurality of first via holes 213 are formed, in the third layer 211c.

According to an embodiment, conductive vias may be formed in the first via hole 213 and the second via hole 215 to electrically connect the second layer 211b to the third layer 211c. Moreover, bridge patterns B1, B2, and B3 connecting two (a pair of) second via holes among the plurality of second via holes 215 may be formed on the third layer 211c.

Figure 11:
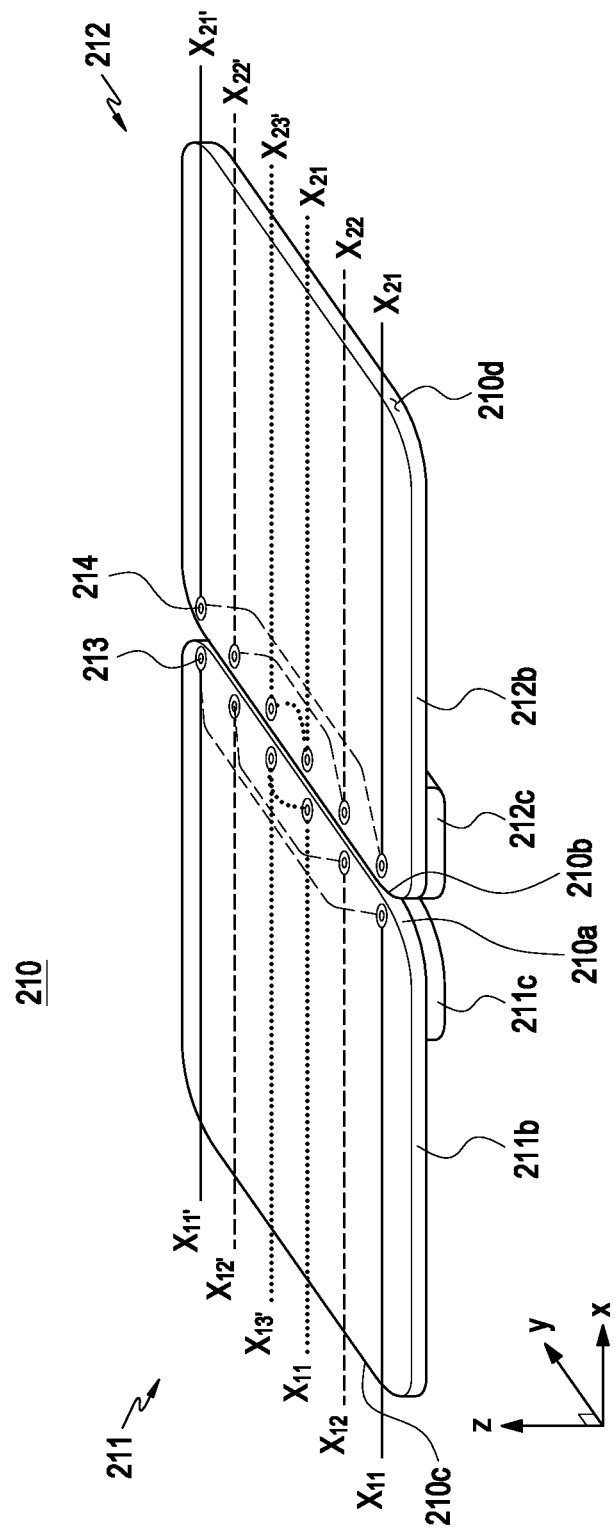
FIG. 11 is a perspective view showing a status in which conductive patterns are aligned when two touch panels are disposed adjacent to each other, according to various embodiments of the present disclosure.

FIG. 11 is a perspective view showing a status in which conductive patterns are aligned when two touch panels 210 are disposed adjacent to each other, according to various embodiments of the present disclosure.

The embodiments described above with reference to FIG. 10 may be similarly applied to the second touch panel 212. The second touch panel 212 may also include the third layer 212c under the second layer 212b, and the third layer 212c of the second touch panel 212 may be disposed to face the third layer 211c of the first touch panel 211 near the folding region. A plurality of first via holes 214 may be formed adjacent to the folding region of the foldable housing (e.g., foldable housing 300 of FIG. 5) in the second layer 212b of the second touch panel 212, and a plurality of second via holes (not shown) may be formed in positions corresponding to positions in which the plurality of first via holes 214 are formed, in the third layer 212c.

According to various embodiments of the present disclosure, one end of an X-axis conductive pattern formed on the second layers 211b and 212b may be connected to a bridge pattern formed on the third layers 211c and 212c to form a loop structure. According to various embodiments, one end of a Y-axis conductive pattern formed on the first layers 211a and 212a may be connected to another end of a Y-axis conductive pattern formed on the second layers 211b and 212b to form a loop structure. According to an embodiment, the pattern formed on the first layers 211a and 212a, the pattern formed on the second layers 211b and 212b, and the patterns formed on the third layers 211c and 212c may be all electrically connected to form a single conductive loop as a whole.

In the present disclosure, apart from the feature that the X-axis conductive pattern and the Y-axis conductive pattern formed on different layers form a single loop pattern as a whole, one end of an X-axis conductive pattern formed on the second layers 211b and 212b may be connected to a bridge pattern formed on the third layers 211c and 212c to form a loop structure.

In the present disclosure, by further including the third layers 211c and 212c having conductive patterns electrically connected to the conductive patterns of the second layers 211b and 212b, the X-axis conductive pattern of the second layers 211b and 212b may maximally extend to an end portion of the touch panel 210 (e.g., one end portion 210a of the first touch panel and/or one end portion 210b of the second touch panel in FIG. 9A), whereby recognition performance of a dual-type touch panel may be sufficiently secured.

In FIG. 11, the X-axis conductive patterns extending from the other end portion 210c of the second layer 211b of the first touch panel 211 to the one end portion 210a may be connected to the bridge pattern formed on the third layer 211c, thus forming a loop structure, respectively. The X-axis conductive patterns extending from the other end portion 210d of the second layer 212b of the second touch panel 212 to the one end portion 210b may be connected to the bridge pattern formed on the third layer 212c, thus forming a loop structure, respectively. As a result, by providing the third layers 211c and 212c, the first touch panel 211 and the second touch panel 212 may be disposed as close to each other as possible while facing each other.

Figure 12:
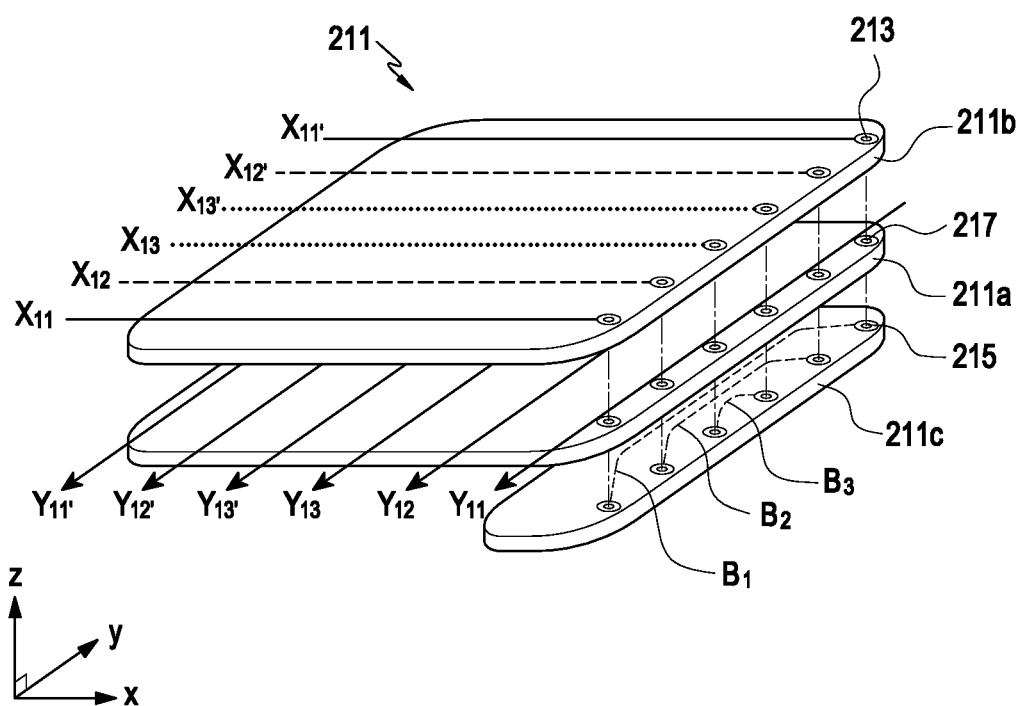
FIG. 12 is an exploded perspective view showing a touch panel on which a conductive pattern is formed, according to an embodiment that is different from that of FIG. 10.

FIG. 12 is an exploded perspective view showing a touch panel (e.g., the first touch panel 211) on which a conductive pattern is formed, according to an embodiment that is different from that of FIG. 10.

In the embodiment shown in FIG. 12, Y-axis conductive patterns Y11, Y12, Y13, Y13', Y12', and Y11' may be formed on the first layer 211a, and X-axis conductive patterns X11, X12, X13, X13', X12', and X11' may be formed on the second layer 211b. However, referring to FIG. 12, the first touch panel 211 may be stacked on a first surface (e.g., the first surface 311 of FIG. 7A) of a first housing (e.g., the first housing 310 of FIG. 7A) sequentially from top in order of the second layer 212b, the first layer 211a, and then the third layer 211c.

In an embodiment of FIG. 12, the stacking order of layers where the X-axis conductive pattern and the Y-axis conductive pattern are formed may be different from that of FIG. 10. Herein, the third layer 211c may not be disposed immediately adjacent to the rear surface of the second layer 211b, but may be disposed with the first layer 211a interposed between the second layer 211b and the third layer 211c.

According to the embodiment of FIG. 12, a plurality of first via holes 213 may be formed adjacent to a folding region (e.g., the folding region 203 of FIG. 2) of a foldable housing (e.g., the foldable housing 300 of FIG. 2) on the second layer 211b, and a plurality of third via holes 217 may be formed in positions adjacent to the folding region of the foldable housing and corresponding to the plurality of first via holes 213 in the first layer 211a. In the third layer 211c, a plurality of second via holes 215 may be formed in positions corresponding to positions in which the plurality of first via holes 213 and the plurality of third via holes 217 are formed. According to an embodiment, conductive vias may be formed in the first via holes 213, the third via holes 217, and the second via holes 215, respectively, to be electrically connected, such that the second layer 211b and the third layer 211c may be electrically connected to each other. In this case, like the embodiment of FIG. 10, the bridge patterns B1, B2, and B3 connecting two (a pair of) second via holes among the plurality of second via holes 215 may be formed on the third layer 211c.

Figure 13:
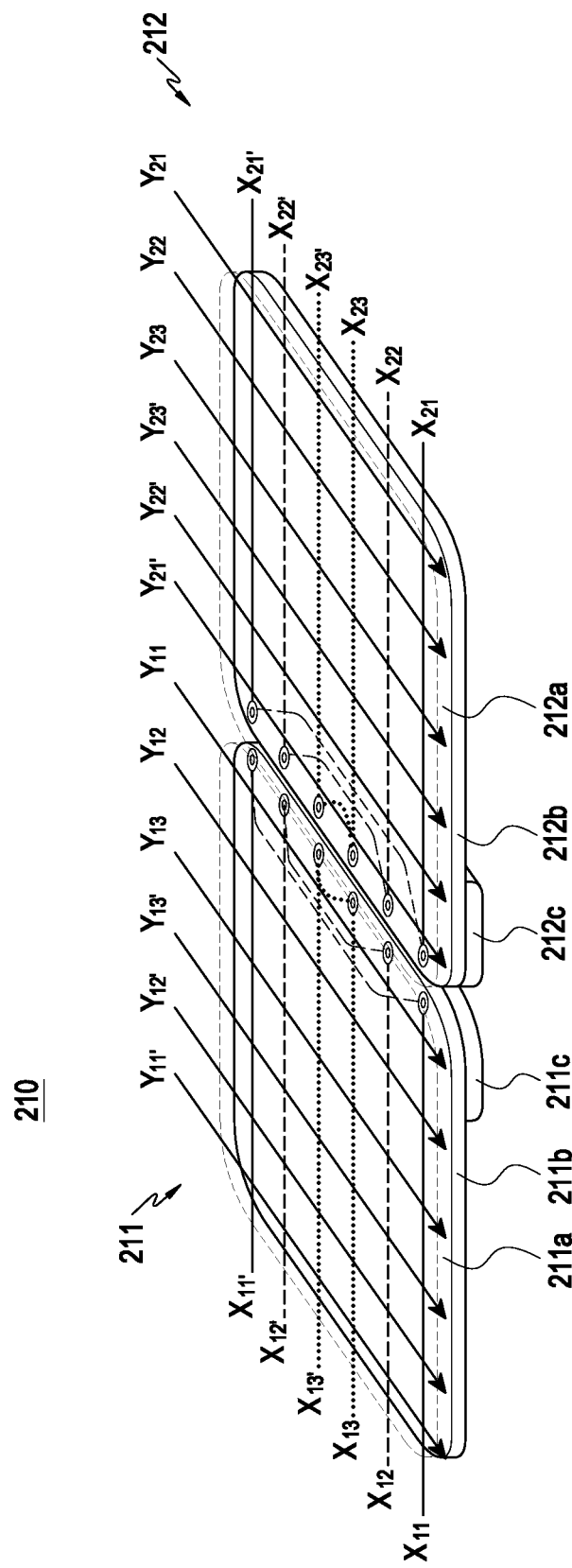
FIG. 13 is a perspective view showing a status in which two touch panels are disposed adjacent to each other, according to various embodiments of the present disclosure.

FIG. 13 is a perspective view showing a status of the touch panel 210 when two touch panels 211 and 212 are disposed adjacent to each other, according to various embodiments of the present disclosure.

Y-axis conductive patterns may be formed spaced apart by a certain distance in a width direction (or a horizontal direction) of the touch panel 210, such that recognition performance may not be affected by disconnection in the folding region of the touch panel 210. However, X-axis conductive patterns may be formed spaced apart by a certain distance in a length direction (or a vertical direction) of the touch panel 210, such that they may not be affected in terms of recognition performance corresponding to disconnection in the folding region (e.g., the folding region 203 of FIG. 2) of the touch panel 210.

Referring to FIG. 13, even when the dual-type touch panel 210 is used, sensing intervals in the X-axis direction and the Y-axis direction may be uniformly formed through an electronic device (e.g., the electronic device 101 of FIG. 7A) according to the present disclosure. The effect may be provided where the X-axis conductive pattern substantially extends to the end portion (e.g., the end portions 210a and 210b of FIG. 8) of the touch panel by using the third layer 211c and the via holes 213, 217, and 215 even when the layer where the Y-axis conductive pattern is formed is disposed under the layer where the X-axis conductive pattern is formed. As the X-axis conductive pattern substantially extends to the end portion (e.g., the end portions 210a and 210b of FIG. 8) of the touch panel, an EMR sensing interval between the first touch panel 211 and the second touch panel 212 may be reduced maximally.

In an electronic device (e.g., the electronic device 101 of FIG. 7A) according to various embodiments of the present disclosure, touch panels (e.g., the first touch panel 211 and the second touch panel 212 of FIG. 9A) may be disposed in a first housing (e.g., the first housing 310 of FIG. 7A) and a second housing (e.g., the second housing 320 of FIG. 7A) constituting a foldable housing (e.g., the foldable housing 300 of FIG. 7A), respectively, thereby preventing damage of the touch panel in a folding region (e.g., the folding region 203 of FIG. 2) and sufficiently securing recognition performance in the folding region of the dual-type touch panel.

When the electronic device (e.g., the electronic device 101 of FIG. 7A) according to various embodiments of the present disclosure includes the magnetic shielding member 220 (e.g., an MMP) shown in FIG. 8, according to an embodiment, the first magnetic shielding member may be disposed on the rear surface of the first touch panel (e.g., the first touch panel 211 of FIG. 9A) and a second magnetic shielding member may be disposed on the rear surface of the second touch panel (e.g., the second touch panel 212 of FIG. 9A), thereby preventing the magnetic shielding member from being damaged by bending of the electronic device.

Moreover, when the electronic device (e.g., the electronic device 101 of FIG. 7A) according to various embodiments of the present disclosure includes a protection member (an adhesive layer, a cushion layer, or a heat-dissipation layer), according to an embodiment, the first protection member may be disposed on the rear surface of the first magnetic shielding member and a second protection member may be disposed on the rear surface of the second magnetic shielding member, thereby preventing the protection member from being damaged by bending of the electronic device.

Meanwhile, an electronic device (e.g., the electronic device 101 of FIG. 7A) according to various embodiments of the present disclosure may include a processor (e.g., the processor 120 of FIG. 1). The processor 120 may execute software to control at least one other component (e.g., a hardware or software component) of the electronic device 101 connected with the processor 120 and may process or compute various data. For example, the processor 120 may be disposed in the first housing 310 and/or the second housing 320, and may be electrically (or operatively) connected to the flexible display 200 and the touch panel 210.

According to an embodiment, an electronic device (e.g., the electronic device 101 of FIG. 7A) may further include a memory (e.g., the memory 130 of FIG. 1). The memory 130 may store various data used by at least one component (e.g., the processor 120 of FIG. 1) of the electronic device 101. The memory 130 may be operatively connected to the processor 120. For example, the memory 130 may store instructions, when executed, for causing the processor 120 to detect the folded status, the unfolded status, or the intermediate status of the foldable housing 300 by using the at least one sensor and to differently control the display 200 based on at least a part of the sensed status.

The processor 120 may provide a command or data received from at least one of the flexible display 200 or the touch panel 210 to a volatile memory of the memory 130, process a command or data stored in the volatile memory, and store resulting data in a non-volatile memory.

Figure 14:
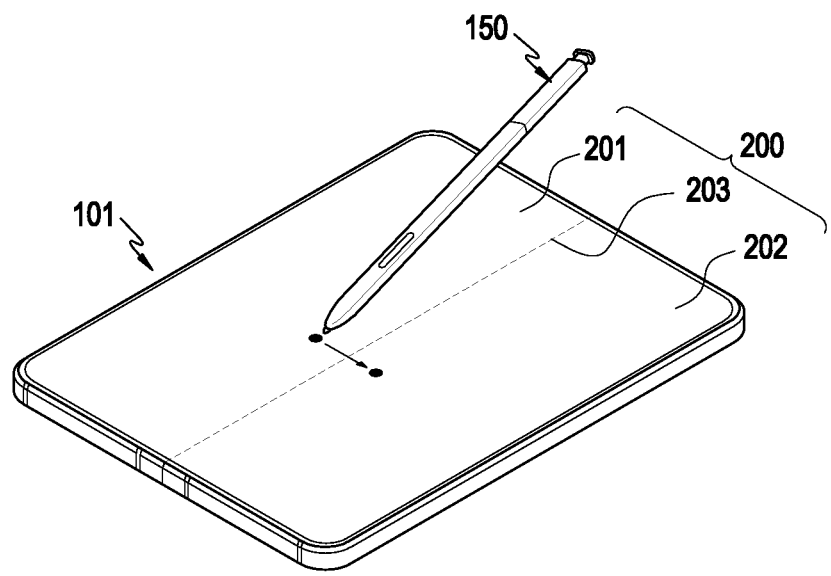
FIG. 14 is a perspective view showing an input method with respect to an electronic device using an input device, according to various embodiments of the present disclosure.
Figure 15:
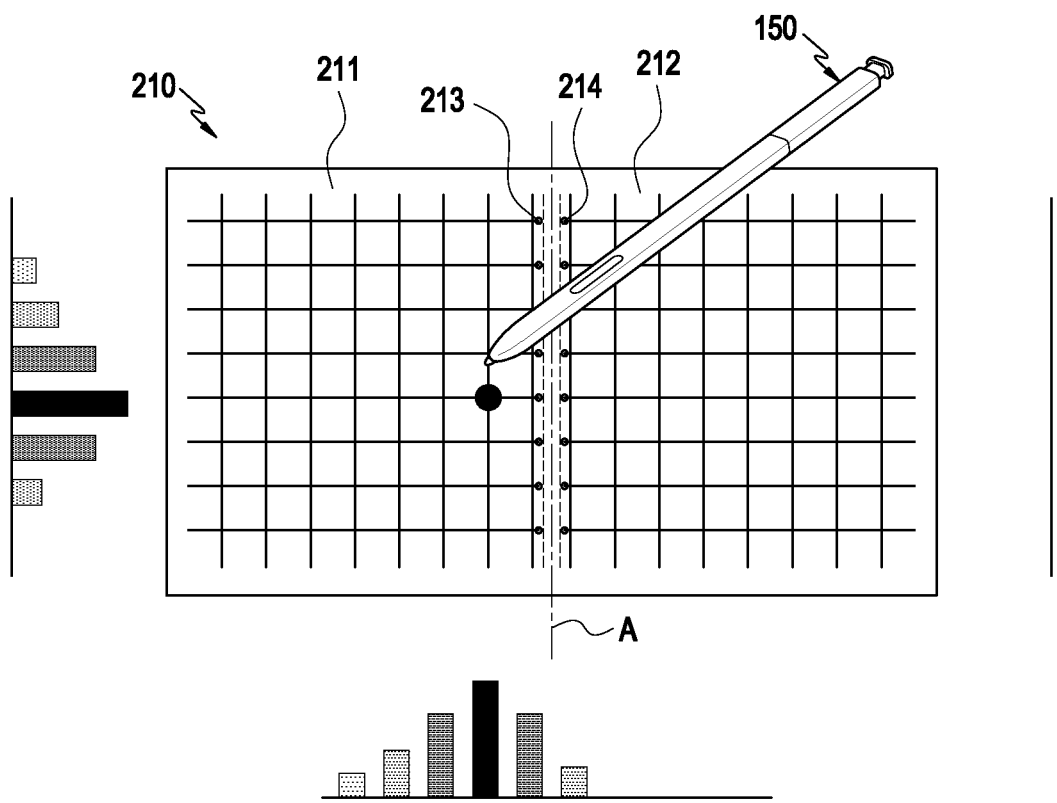
FIG. 15 is a conceptual view showing a method of recognizing an input of an input device in a certain region (e.g., a first region) of a display, according to various embodiments of the present disclosure.
Figure 16:
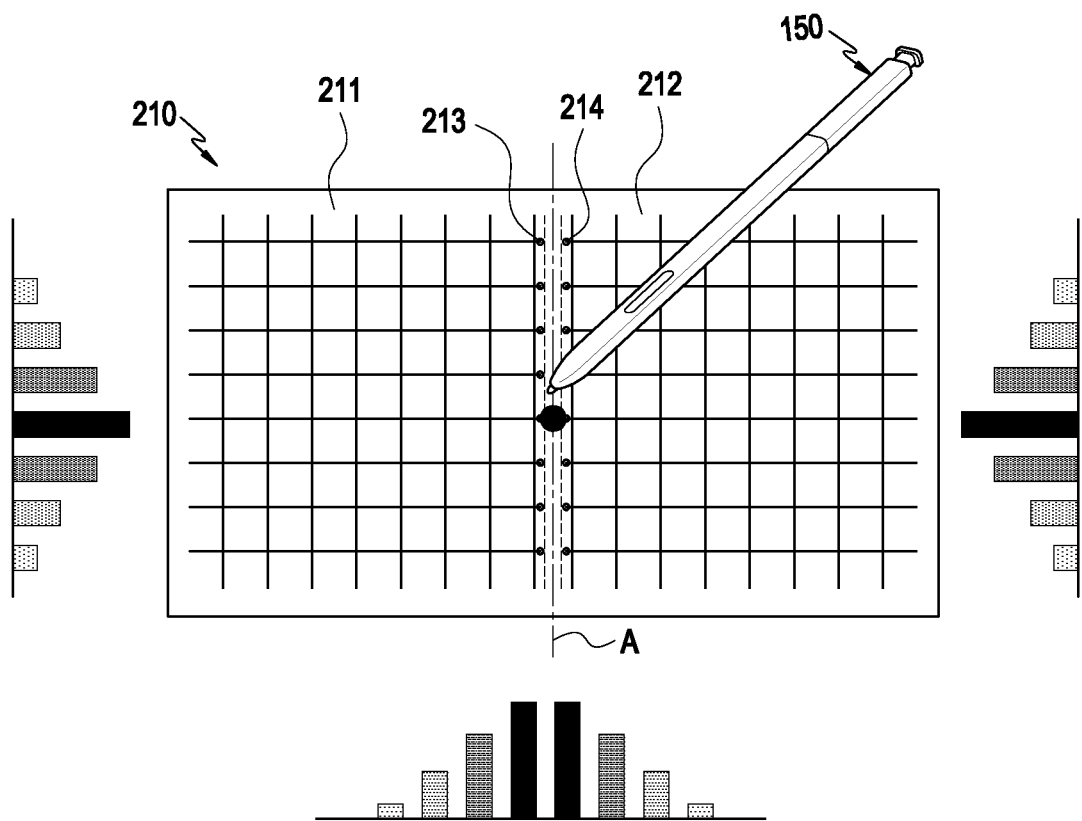
FIG. 16 is a conceptual view showing a method of recognizing an input of an input device in a folding region of a display, according to various embodiments of the present disclosure.
Figure 17A:
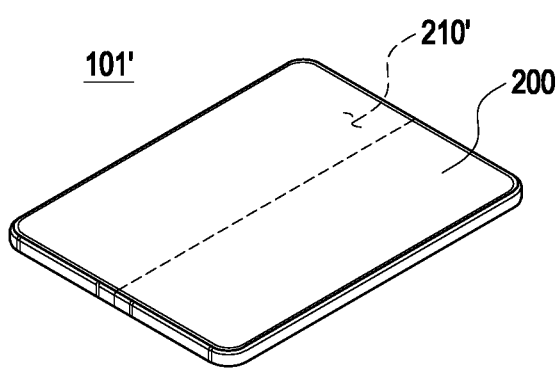
FIGS. 17A-17D are perspective views showing unfolded statuses and partially unfolded, intermediate statuses of an electronic device including a single touch panel and an electronic device including a dual-touch panel.
Figure 17B:
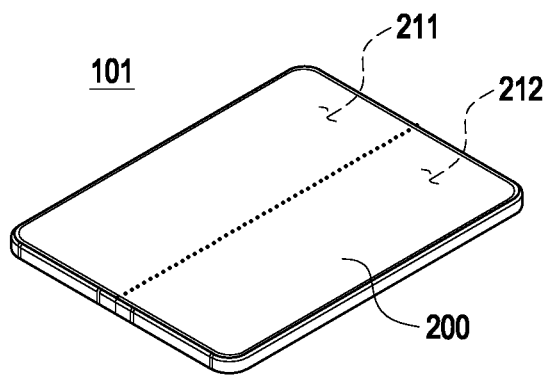
Figure 17C:
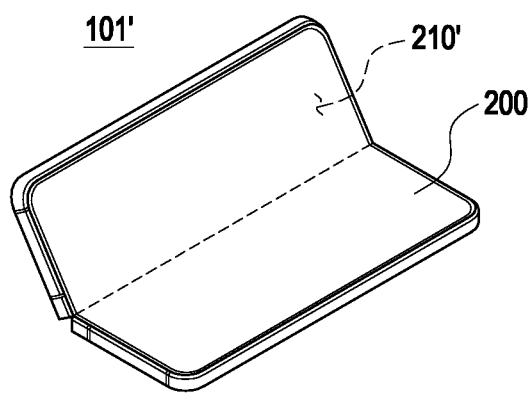
Figure 17D:
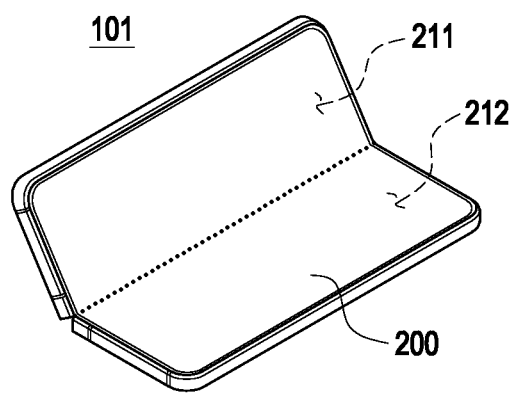

FIG. 14 is a perspective view showing an input method with respect to the electronic device 101 using the input device 150 (e.g., a stylus pen), according to various embodiments of the present disclosure. FIG. 15 is a conceptual view showing a method of recognizing an input of the input device 150 in a certain region (e.g., a first region) of a display, according to various embodiments of the present disclosure. FIG. 16 is a conceptual view showing a method of recognizing an input of the input device 150 in a folding region (e.g., the folding region 203 of FIG. 2) of a display, according to various embodiments of the present disclosure.

Referring to FIGS. 14 through 16 together, the processor (e.g., processor 120 of FIG. 1) may independently process recognition of an input on the first touch panel 211 or the second touch panel 212. According to an embodiment, the processor 120 may process recognition in a folding region (e.g., the folding region 203 of FIG. 2) of the foldable housing (e.g., the foldable housing 300 of FIG. 2) by determining levels of signals input through the first touch panel 211 and the second touch panel 212, respectively, based on instructions stored in the memory 130.

Referring to FIGS. 15 and 16, inputs to the first touch panel 211 and the second touch panel 212 using the input device 150 may be performed independently, and it may be determined based on the intensity of energy input through the input device 150, whether the input device 150 is on the first touch panel 211, on the second touch panel 212, or in a boundary point. For example, a position of the input device 150 may be known from an intensity change of electromagnetic induction energy through a reception (Rx) channel of the first touch panel 211 or the second touch panel 212.

According to an embodiment, when the input device 150 is positioned between the first touch panel 211 and the second touch panel 212 or the input device 150 is dragged between the first touch panel 211 and the second touch panel 212, the position of the input device 150 may be known through the intensity change of the electromagnetic induction energy received through the rightmost Rx channel of the first touch panel 211 and the leftmost Rx channel of the second touch panel 212.

FIG. 17 is a perspective view showing unfolded statuses and partially unfolded, intermediate statuses of an electronic device 101' including a single touch panel and the electronic device 101 including a dual-touch panel.

According to the present disclosure, by using the dual-type touch panels 211 and 212 divided into two on the rear surface of the flexible (or foldable) display 200, a lifespan problem in the folding region may be overcome when a single-type touch panel 210' is used. Moreover, by including a separate layer (e.g., a third layer) that allows a loop pattern to pass at a position adjacent to the folding region in the dual-type touch panels 211 and 212, the widening of the sensing interval corresponding to the segmentation of the touch panel may be minimized, thereby preventing recognition performance of the touch panel from being degraded.

In addition, the electronic device 101 according to the present disclosure enables simultaneous comparison of a signal level of each touch panel in the folding region, thereby actively performing coordinates processing.

According to various embodiments of the present disclosure, an electronic device (e.g., the electronic device 101 of FIG. 1) includes a hinge; a foldable housing including a first housing (e.g., first housing 310 of FIG. 7A) connected to the hinge (e.g., hinge 510 of FIG. 7A) and including a first surface (e.g., first surface 311 of FIG. 7A) facing a first direction and a second surface (e.g., second surface 312 of FIG. 7A) facing a second direction opposite to the first direction; and a second housing (e.g., second housing 320 of FIG. 7A) connected to the hinge, including a third surface (e.g., third surface 321 of FIG. 7A) facing a third direction and a fourth surface (e.g., fourth surface 322 of FIG. 7A) facing a fourth direction opposite to the third direction, and being folded with the first housing around the hinge; a flexible display (e.g., flexible display 200 of FIG. 7A) viewed from an outside of at least one surface of the foldable housing and extending from the first surface of the first housing to the third surface of the second housing; and a touch panel (e.g., touch panel 210 of FIG. 7A) disposed adjacent to the flexible display, in which the touch panel includes a first touch panel disposed on the first surface of the first housing and a second touch panel disposed on the third surface of the second housing, and each of the first touch panel and the second touch panel includes a first layer (e.g., first layer 211a of FIG. 10A or FIG. 12) on which a pattern is formed, a second layer (e.g., second layer 211b of FIG. 10A or FIG. 12) on which a pattern different from the pattern formed on the first layer is formed, and a third layer (e.g., third layer 211c of FIG. 10A or FIG. 12) electrically connected to the pattern of the second layer.

According to various embodiments, the pattern formed on the first layer may be electrically connected to the pattern formed on the second layer, and a whole loop is formed by the pattern formed on the first layer, the pattern formed on the second layer, and the pattern formed on the third layer.

According to various embodiments, in an unfolded state, the first layer may have, formed thereon, a conductive pattern facing a fifth direction perpendicular to the first direction or the third direction, and the second layer may have, formed thereon, a conductive pattern facing a sixth direction perpendicular to the fifth direction and perpendicular to the first direction or the third direction.

According to various embodiments, the third layer, in a folding region of the foldable housing, may be disposed on the second surface of the second layer facing the second direction for the first touch panel and facing the fourth direction for the second touch panel.

According to various embodiments, the first layer and the second layer may be formed to have substantially a same size as a total size of the first touch panel or the second touch panel, and the third layer is formed with a size smaller than sizes of the first layer and the second layer and may extend adjacent to the folding region of the foldable housing.

According to various embodiments, the first layer (e.g., first layer 211a of FIG. 10A), the second layer (e.g., second layer 211b of FIG. 10A) and the third layer (e.g., third layer 211c of FIG. 10A) may be stacked on the first surface sequentially in the second direction from a top of the first touch panel.

According to various embodiments, a plurality of first via holes (e.g., first via holes 213 of FIG. 10B) may be formed adjacent to the folding region of the foldable housing in the second layer (e.g., second layer 211b of FIG. 10B), and a plurality of second via holes (e.g., second via holes 215 of FIG. 10B) may be formed in the third layer (e.g., third layer 211c of FIG. 10B) at positions corresponding to positions in which the plurality of first via holes are formed in the second layer (e.g., second layer 211b of FIG. 10B).

According to various embodiments, a plurality of bridge patterns (e.g., bridge patterns B1, B2, and B3 of FIG. 10B) connecting a pair of second via holes among the plurality of second via holes may be formed in the third layer.

According to various embodiments, the second layer (e.g., second layer 211b of FIG. 12), the first layer (e.g., first layer 211a of FIG. 12) and the third layer (e.g., third 211c of FIG. 12) may be stacked on the first surface sequentially in the second direction from a top of the first touch panel.

According to various embodiments, the plurality of first via holes (e.g., holes 213 of FIG. 12) may be formed adjacent to the folding region of the foldable housing in the second layer, a plurality of third via holes (e.g., third via holes 217 of FIG. 12) may be formed in positions adjacent to the folding region of the foldable housing and corresponding to the first via holes, and the plurality of second via holes (e.g., second via holes 215 of FIG. 12) may be formed in positions corresponding to positions in which the plurality of first via holes and the plurality of third via holes are formed, in the third layer.

According to various embodiments, a first magnetic shielding member (e.g., first magnetic shielding member 220 of FIG. 8) may be disposed on the second surface of the first touch panel, and a second magnetic shielding member (e.g., second magnetic shielding member 220 of FIG. 8) may be disposed on the fourth surface of the second touch panel.

According to various embodiments, a first protection member (e.g., first protection member 230 of FIG. 6A) may be disposed on a surface of the first magnetic shielding member opposite to a surface of the magnetic shielding member disposed on the second surface, and a second protection member (e.g., second protection member 230 of FIG. 6A) may be disposed on a surface of the second magnetic shielding member opposite to a surface of the second magnetic shielding member disposed on the fourth surface.

According to various embodiments, the electronic device may further include a first circuit board disposed inside the first housing, a second circuit board disposed inside the second housing, and a flexible circuit board connecting the first circuit board with the second circuit board.

According to various embodiments, the electronic device may further include a processor disposed in the first housing or the second housing and electrically connected to the display and the touch panel.

According to various embodiments, the electronic device may further include a memory operatively connected to the processor, in which the memory includes instructions, when executed, for causing the processor to independently process recognition of an input on the first touch panel or the second touch panel, and determine levels of signals input through the first touch panel and the second touch panel together to perform the recognition in a folding region.

According to various embodiments of the present disclosure, an electronic device may include a hinge; a foldable housing including a first housing connected to the hinge and including a first surface facing a first direction and a second surface facing a second direction opposite to the first direction; and a second housing connected to the hinge, including a third surface facing a third direction and a fourth surface facing a fourth direction opposite to the third direction, and being folded with the first housing around the hinge; a flexible display viewed from an outside of at least one surface of the foldable housing and extending from the first surface of the first housing to the third surface of the second housing; a touch panel disposed adjacent to the flexible display; and a processor disposed in the first housing or the second housing and electrically connected to the display and the touch panel, in which the touch panel includes a first touch panel disposed on the first surface of the first housing and a second touch panel disposed on the third surface of the second housing, in which the first touch panel includes a first-first layer on which a pattern is formed, a first-second layer on which a pattern different from the pattern formed on the first-first layer is formed, and a first-third layer electrically connected to the pattern of the first-second layer by using at least two conductive vias, and the second touch panel includes a second-first layer on which a pattern is formed, a second-second layer on which a pattern different from the pattern formed on the second-first layer, and a second-third layer electrically connected to the pattern of the second-second layer by using at least two conductive vias.

According to various embodiments of the present disclosure, the first-first layer and the first-second layer may be formed with substantially the same size as the entire size of the first touch panel, the first-third layer may elongated adjacent to the folding region of the foldable housing with an size smaller than that of the first-first layer and the first-second layer, and the second-first layer and the second-second layer may be formed with substantially the same size as the entire size of the second touch panel, and the second-third layer may be elongated adjacent to the folding region of the foldable housing with an size smaller than that of the second-first layer and the second-second layer, such that in the unfolded status of the electronic device, the first-third layer and the second-third layer may be disposed spaced apart by a certain distance to face each other.

According to various embodiments of the present disclosure, a plurality of bridge patterns connecting two different conductive vias among the at least two conductive vias may be formed in the first-third layer and the second-third layer.

According to various embodiments of the present disclosure, a first magnetic shielding member may be disposed on a rear surface of the first touch panel, and a second magnetic shielding member may be disposed on a rear surface of the second touch panel.

According to various embodiments, the electronic device may further include a memory operatively connected to the processor, in which the memory includes instructions, when executed, for causing the processor to independently process recognition of an input on the first touch panel or the second touch panel and determine levels of signals input through the first touch panel and the second touch panel together to perform the recognition in a folding region.

Although the present disclosure has been described with various embodiments, various changes and modifications may be suggested to one skilled in the art. It is intended that the present disclosure encompass such changes and modifications as fall within the scope of the appended claims.

What is claimed is:
1. An electronic device comprising:
a hinge;
a foldable housing including;
a first housing connected to the hinge and including a first surface facing a first direction and a second surface facing a second direction opposite to the first direction; and
a second housing connected to the hinge, including a third surface facing a third direction and a fourth surface facing a fourth direction opposite to the third direction, and configured to be folded with the first housing around the hinge;
a flexible display configured to be viewed from an outside of at least one surface of the foldable housing and extending from the first surface of the first housing to the third surface of the second housing; and a touch panel disposed adjacent to the flexible display,
wherein the touch panel includes a first touch panel disposed on the first surface of the first housing and a second touch panel disposed on the third surface of the second housing, and
wherein each of the first touch panel and the second touch panel includes:
a first layer on which a pattern is formed,
a second layer on which a pattern different from the pattern formed on the first layer is formed, and
a third layer electrically connected to the pattern of the second layer.

2. The electronic device of claim 1, wherein:
the pattern formed on the first layer is electrically connected to the pattern formed on the second layer, and
a whole loop is formed by the pattern formed on the first layer, the pattern formed on the second layer, and the pattern formed on the third layer.

3. The electronic device of claim 1, wherein in an unfolded status, the first layer has, formed thereon, a conductive pattern facing a fifth direction perpendicular to the first direction or the third direction, and the second layer has, formed thereon, a conductive pattern facing a sixth direction perpendicular to the fifth direction and perpendicular to the first direction or the third direction.

4. The electronic device of claim 1, wherein, in a folding region of the foldable housing:
the third layer is disposed on a rear surface of the second layer facing the second direction for the first touch panel and facing the fourth direction for the second touch panel.

5. The electronic device of claim 1, wherein:
the first layer and the second layer are formed to have substantially a same size as a total size of the first touch panel or the second touch panel, and
wherein the third layer is formed with a size smaller than sizes of the first layer and the second layer and extends adjacent to a folding region of the foldable housing.

6. The electronic device of claim 1, wherein the first layer, the second layer and the third layer are stacked on the first surface sequentially in the second direction from a top of the first touch panel.

7. The electronic device of claim 6, wherein:
a plurality of first via holes are formed adjacent to a folding region of the foldable housing in the second layer, and
a plurality of second via holes are formed in the third layer at positions corresponding to positions in which the plurality of first via holes are formed in the second layer.

8. The electronic device of claim 7, wherein a plurality of bridge patterns formed on the third layer connect pairs of second via holes among the plurality of second via holes.

9. The electronic device of claim 1, wherein the second layer, the first layer and the third layer are stacked on the first surface sequentially in the second direction from a top of the first touch panel.

10. The electronic device of claim 9, wherein:
a plurality of first via holes are formed adjacent to a folding region of the foldable housing in the second layer,
a plurality of third via holes are formed in the first layer adjacent to the folding region of the foldable housing in positions corresponding to the first via holes in the second layer, and
a plurality of second via holes are formed in the third layer in positions corresponding to the positions in which the plurality of first via holes are formed in the second layer and the positions in which the plurality of third via holes are formed in the first layer.

11. The electronic device of claim 10, wherein a plurality of bridge patterns formed on the third layer connect a pair of second via holes among the plurality of second via holes formed on the third layer.

12. The electronic device of claim 1, wherein a first magnetic shielding member is disposed on a rear surface of the first touch panel, and a second magnetic shielding member is disposed on a rear surface of the second touch panel.

13. The electronic device of claim 12, wherein a first protection member is disposed on a rear surface of the first magnetic shielding member, and a second protection member is disposed on a rear surface of the second magnetic shielding member.

14. The electronic device of claim 1, comprising a processor disposed in the first housing or the second housing and electrically connected to the flexible display and the touch panel.

15. The electronic device of claim 14, further comprising a memory operatively connected to the processor,
wherein the memory stores instructions that are configured to, when executed, cause the processor to:
independently process recognition of an input on the first touch panel or the second touch panel, and
determine levels of signals input through the first touch panel and the second touch panel together to perform the recognition in a folding region.

16. An electronic device may comprising:
a hinge;
a foldable housing including:
a first housing connected to the hinge and including a first surface facing a first direction and a second surface facing a second direction opposite to the first direction; and
a second housing connected to the hinge, including a third surface facing a third direction and a fourth surface facing a fourth direction opposite to the third direction, and being folded with the first housing around the hinge;
a flexible display viewed from an outside of at least one surface of the foldable housing and extending from the first surface of the first housing to the third surface of the second housing;
a touch panel disposed adjacent to the flexible display; and
a processor disposed in the first housing or the second housing and electrically connected to the display and the touch panel,
wherein the touch panel includes a first touch panel disposed on the first surface of the first housing and a second touch panel disposed on the third surface of the second housing,
wherein the first touch panel includes a first-first layer on which a pattern is formed, a first-second layer on which a pattern different from the pattern formed on the first-first layer is formed, and a first-third layer electrically connected to the pattern of the first-second layer by using at least two conductive vias, and
wherein the second touch panel includes a second-first layer on which a pattern is formed, a second-second layer on which a pattern different from the pattern formed on the second-first layer is formed, and a second-third layer electrically connected to the pattern of the second-second layer by using at least two conductive vias.

17. The electronic device of claim 16, wherein the first-first layer and the first-second layer are formed with substantially the same size as the entire size of the first touch panel, the first-third layer is elongated adjacent to the folding region of the foldable housing with an size smaller than that of the first-first layer and the first-second layer, and the second-first layer and the second-second layer are formed with substantially the same size as the entire size of the second touch panel, and the second-third layer is elongated adjacent to the folding region of the foldable housing with an size smaller than that of the second-first layer and the second-second layer, such that in the unfolded status of the electronic device, the first-third layer and the second-third layer are disposed spaced apart by a certain distance to face each other.

18. The electronic device of claim 16, wherein the electronic device further include:
- a plurality of bridge patterns connecting two different conductive vias among the at least two conductive vias may be formed in the first-third layer and the second-third layer.

19. The electronic device of claim 1, wherein:
- a first magnetic shielding member is disposed on a rear surface of the first touch panel, and
- a second magnetic shielding member is disposed on a rear surface of the second touch panel.

20. The electronic device of claim 16, the electronic device may further include:
- a memory operatively connected to the processor, in which the memory includes instructions, when executed, for causing the processor to independently process recognition of an input on the first touch panel or the second touch panel and determine levels of signals input through the first touch panel and the second touch panel together to perform the recognition in a folding region.

* * * * *